(12) United States Patent  
Bader

(10) Patent No.: US 9,383,922 B2
(45) Date of Patent: Jul. 5, 2016

(54) KEYBOARD-BASED NAVIGATION OF A USER INTERFACE

(75) Inventor: Bjoern Bader, Eppelheim (DE)

(73) Assignee: SAP SE, Walldorf (DE)

(*) Notice: Subject to any disclaimer, the term of this patent is extended or adjusted under 35 U.S.C. 154(b) by 339 days.

(21) Appl. No.: 13/609,256

(22) Filed: Sep. 11, 2012

(65) Prior Publication Data

US 2014/0075386 A1    Mar. 13, 2014

(51) Int. Cl.
*G06F 3/0489* (2013.01)
*G06F 3/0484* (2013.01)
*G06F 3/0488* (2013.01)

(52) U.S. Cl.
CPC ........ *G06F 3/04892* (2013.01); *G06F 3/04842* (2013.01); *G06F 3/04886* (2013.01)

(58) Field of Classification Search
CPC .......... G06F 17/30905; G06F 17/2229; G06F 3/04886; G06F 3/04842
USPC .......................................................... 715/825
See application file for complete search history.

(56) References Cited

U.S. PATENT DOCUMENTS

| | | | | |
|---|---|---|---|---|
| 7,788,601 | B2 * | 8/2010 | Scott ............................ | 715/812 |
| 2001/0017634 | A1 * | 8/2001 | Scott ................... | G06F 3/04892 715/767 |
| 2004/0210851 | A1 * | 10/2004 | Premchandran .... | G06F 3/04892 715/851 |
| 2011/0276910 | A1 * | 11/2011 | Mouyade et al. ............. | 715/767 |
| 2012/0036434 | A1 * | 2/2012 | Oberstein ..................... | 715/702 |
| 2013/0167060 | A1 * | 6/2013 | Wang ............................ | 715/769 |

FOREIGN PATENT DOCUMENTS

WO    WO02/052395 A2 * 12/2001

OTHER PUBLICATIONS

Samet et al. Storing a collection of polygons using quadtrees; pp. 1-41; © 1985.*
WO 02/052395 A2; Glasslander, Display Generating Device, Dec. 14, 2001.*
Samet et al. (Storing a collection of polygons using quadtrees; pp. 1-41; © 1985).*

* cited by examiner

*Primary Examiner* — Sherrod Keaton

(57) ABSTRACT

Various embodiments of systems and methods for keyboard-based navigation of a user interface are described herein. An area around a first object displayed on a user interface is divided into quadrants and one or more segments for at least one of the quadrants. The user interface includes a plurality of objects and the quadrants represent directions with respect to the first object. In response to a key stroke indicating a first direction, a first one of the quadrants corresponding to the first direction is identified. The segments of the first quadrant are scanned to identify a second object that is closest to the first object in the first quadrant. The second object is then selected.

22 Claims, 27 Drawing Sheets

WORD WORD WORD AT1 WORD WORD WORD LINK WORD WORD WORD AT2 WORD AT3 WORD AT4 WORD WORD WORD

FIG. 23

KEYBOARD-BASED NAVIGATION OF A USER INTERFACE

FIELD

The field relates generally to user interface navigation. More particularly, the field relates to user interface navigation using a keyboard.

BACKGROUND

Mouse and keyboard are typical means for navigating a user interface (UI). A user can navigate a UI and reach a desired UI object using a mouse or a keyboard. A mouse can be more versatile for navigating a user interface. A user can simply move the cursor to a desired UI object using the mouse and make a selection. Keys such as up arrow key, down arrow key, left arrow key, and right arrow key are used for keyboard-based navigation. A combination of these keys can be used to navigate a UI and reach a desired UI object. Spreadsheets, tables, and other grid-type user interface environments can be conveniently navigated using a keyboard. However, keyboard-based navigation is not convenient and, in some cases, not possible for free or unstructured environments where UI objects are not in a grid-like arrangement. A user has to resort to a mouse to navigate such unstructured environments.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIGS. 22 and 23 illustrate the process of identification of an active text object, according to one embodiment.

DETAILED DESCRIPTION

Embodiments of techniques for keyboard-based navigation of a user interface are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
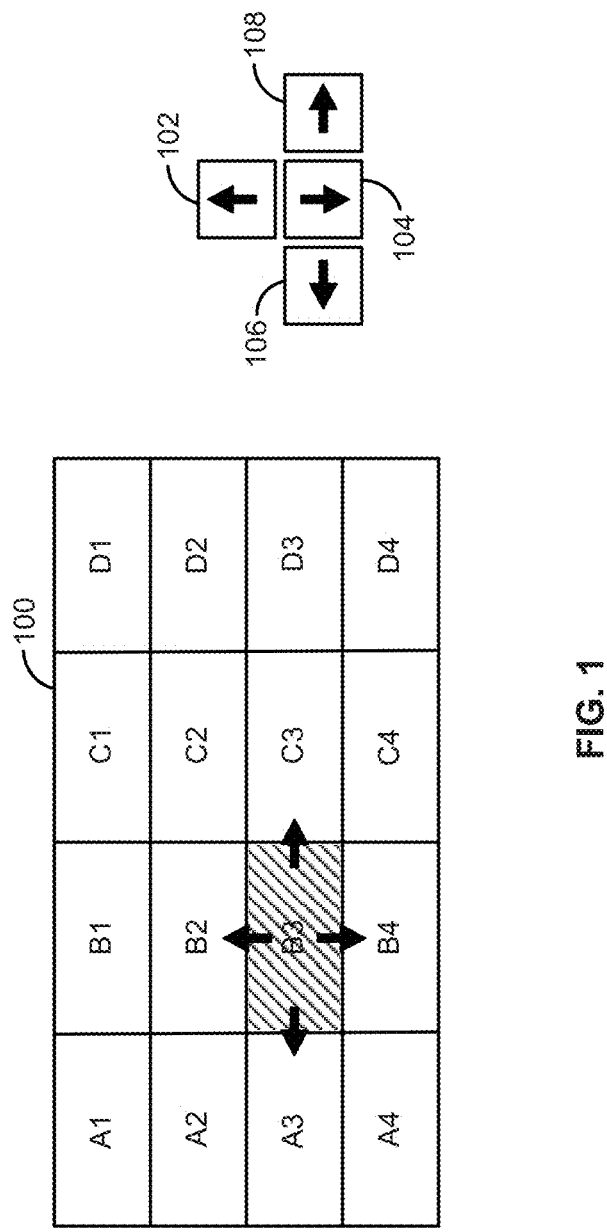
FIG. 1 illustrates a grid-type environment that can be navigated using a keyboard.

Grid type user interfaces can be conveniently navigated using a keyboard. A grid type user interface (UI) includes UI elements arranged in rows and columns or along vertical and horizontal lines. For example, referring to FIG. 1, a spreadsheet 100 is a grid type UI that includes a plurality of cells. The cells are arranged in rows and columns. Directional keys such as up arrow key 102, down arrow key 104, left arrow key 106, and right arrow key 108 are used to navigate the spreadsheet and select cells. If a user intends to select a cell that is above a currently selected cell, the up arrow key 102 is used. Therefore, it is straightforward to determine which direction the user intends to navigate and accordingly represent the movement on the spreadsheet.

Figure 2:
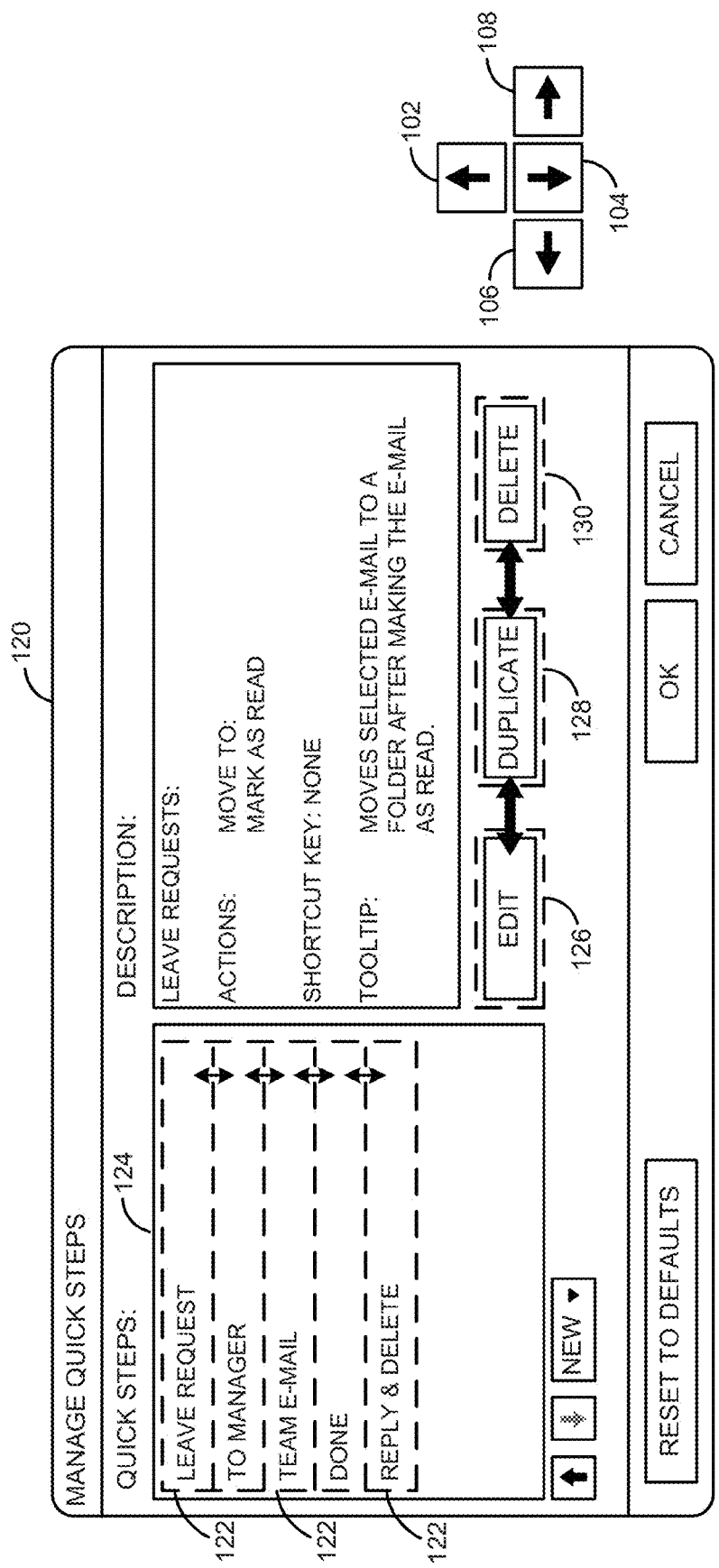
FIG. 2 illustrates another grid-type environment that can be navigated using a keyboard.

FIG. 2 illustrates another grid-type UI 120. This UI 120 is includes UI objects arranged in a grid. For example, the UI objects 122 in the quicksteps portion 124 are arranged along a vertical line. These UI objects 122 can be selected using the up arrow key 102 and the down arrow key 104. The edit button 126, duplicate button 128, and delete button 130 are arranged along a horizontal line. A user can move between edit, duplicate, and delete buttons using the left arrow key 106 and the right arrow key 108 and select one of them. Therefore, it is easier to determine which direction the user intends to navigate in case of structured environments.

Figure 3A:
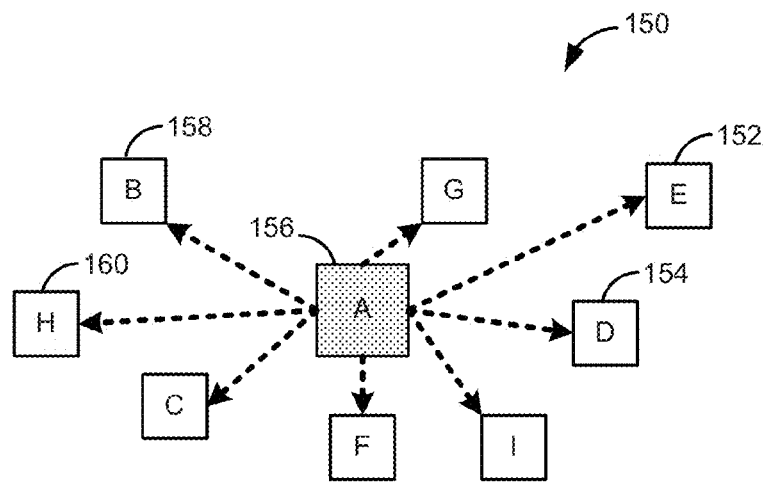
FIG. 3A illustrates an unstructured UI environment, as an example.

In unstructured environments, UI objects are scattered in a UI area without any specific pattern. These UI objects are not arranged in a grid or in any other sequence. FIG. 3A illustrates UI objects in an unstructured environment 150. Navigating such unstructured environments with a keyboard is not possible. Consider the UI objects A, E, and D in the unstructured environment 150. Object E 152 and object D 154 are on the right side of the object A 156. If a user selects the right arrow key, then it is not possible to determine which object the user is intending to select since both object E 152 and object D 154 are on the right side of the object A 156. Similarly, if a user selects the left arrow key, then it is not possible to determine which object the user is intending to select since both object B 158 and object H 160 are on the left side of the object A 156.

Figure 3B:
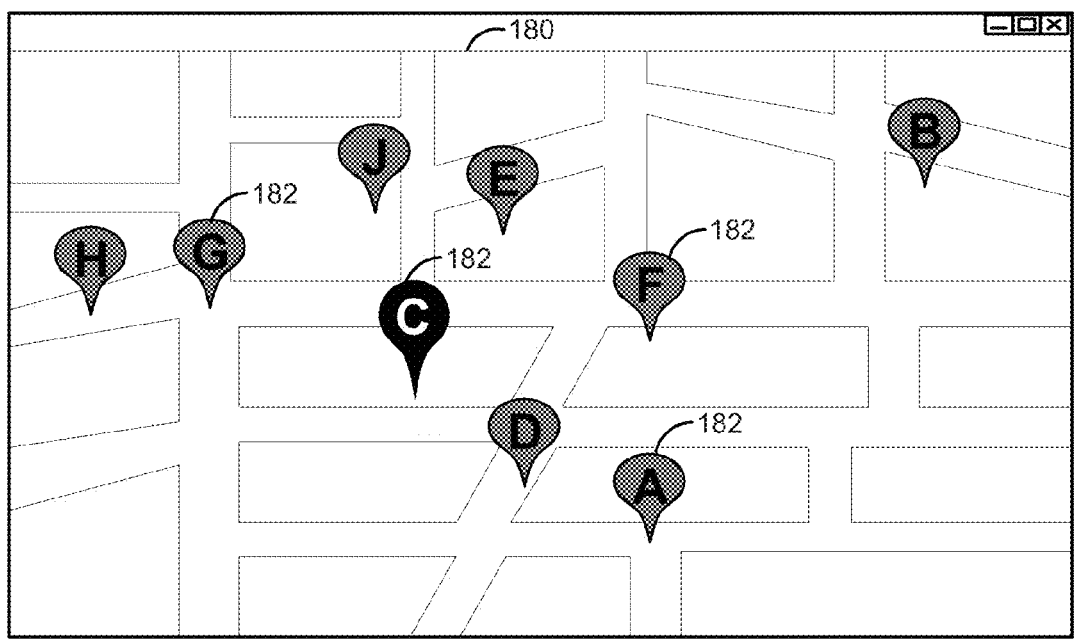
FIG. 3B is a block diagram of a map as an example of an unstructured UI environment.

There are several types of unstructured environments that include scattered UI objects. One such unstructured environment is a map displayed on a UI, as shown in FIG. 3B. A map 180 includes UI objects such as pins 182 which represent various locations. Navigating from one pin to another pin may not be possible using the keyboard since the pins 182 are scattered. The pins 182 are not in a grid-type or any sequential arrangement. The keyboard-based navigation method 200 is explained in reference to the map environment. However, it should be understood that the method can be applied to any unstructured environment for navigating between UI objects.

Although a pointing device such as a mouse can be more versatile in navigating a user interface, there are several situations where a keyboard is preferable. For example, some users, while working with a keyboard, may be more comfortable using the keyboard to navigate the UI instead of switching to a mouse. As another example, physically challenged users may also find a keyboard more comfortable and practical since operation of a mouse requires relatively more precision. A keyboard can be any type of keyboard on a computing device or any input device that includes keys to move up, down, left, and right in a user interface.

Figure 4:
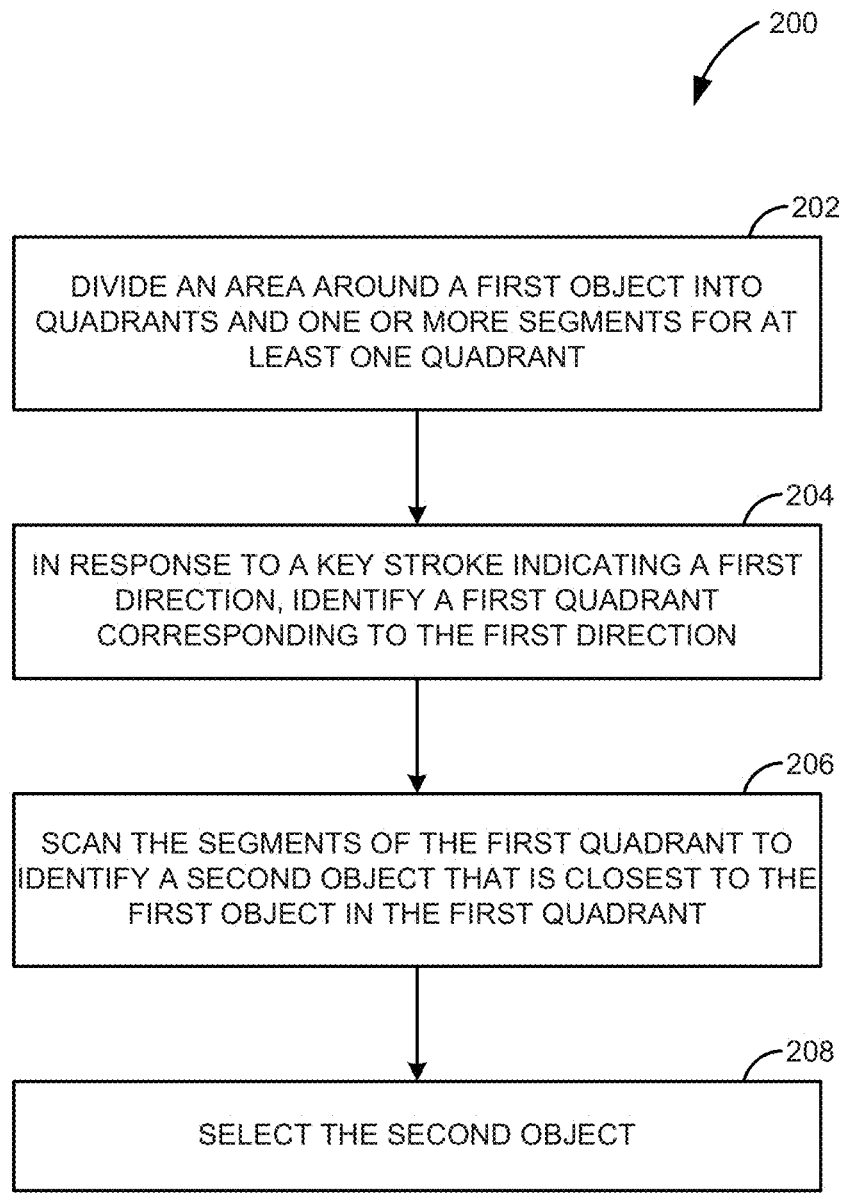
FIG. 4 is a block diagram of a keyboard-based navigation method, according to one embodiment.
Figure 5:
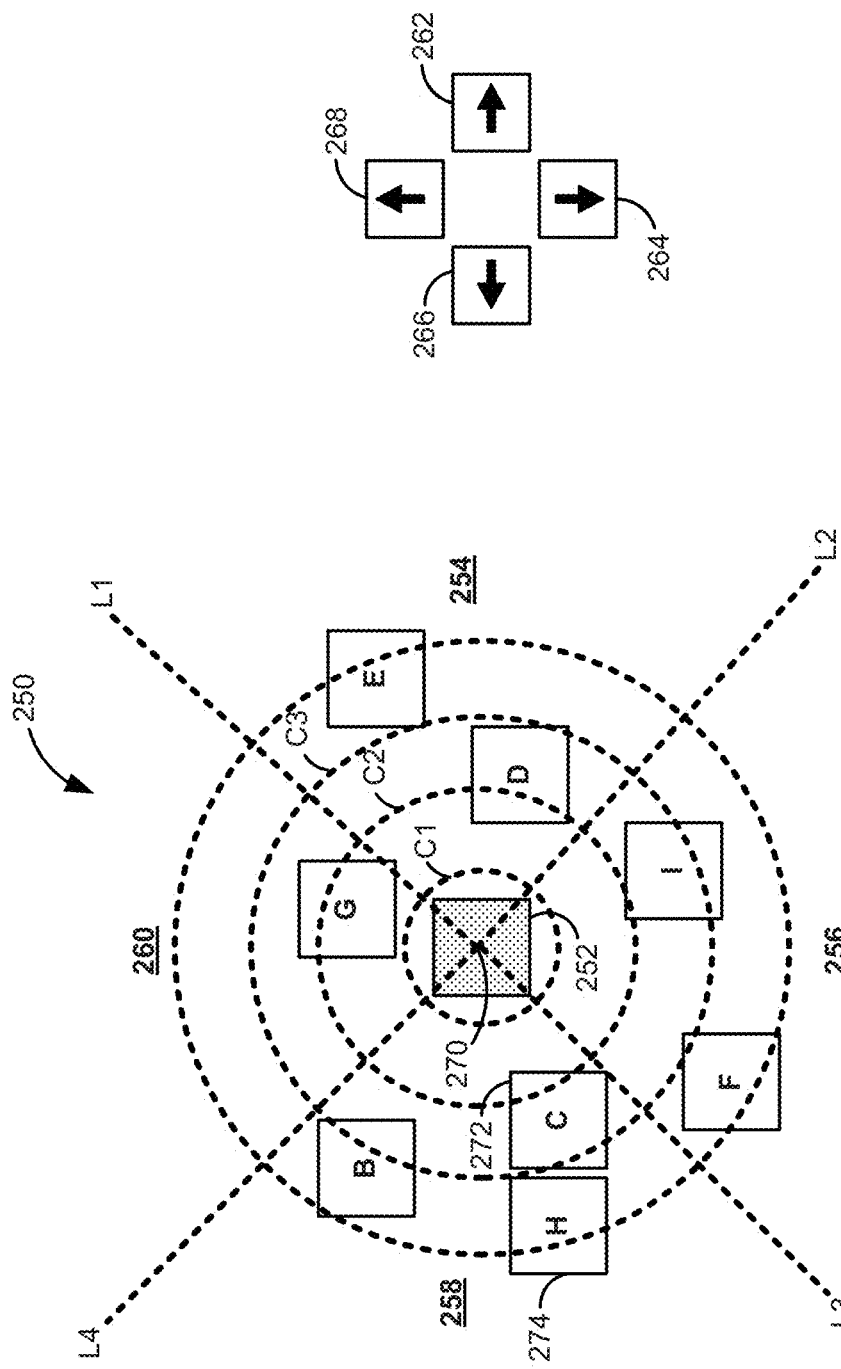
FIG. 5 illustrates quadrants and segments, according to one embodiment.

FIG. 4 illustrates an embodiment of the keyboard-based navigation method 200. At 202, an area around a first object displayed on a user interface is divided into quadrants. The user interface is an unstructured user interface 250 including a plurality of UI objects, as shown in FIG. 5. The area around the first object 252 is divided into four equal quadrants, with the first object 252 as the center. In one embodiment, the area around the first object 252 is the user interface area around the first object 252. The quadrants are defined by lines L1, L2, L3, and L4 that originate from the first object 252.

The central angle of each quadrant is 90 degrees. For example, a right-side quadrant 254 is the area between lines L1 and L2. The angle between the lines L1 and L2 is 90 degrees, which is the central angle of the right-side quadrant 254. Similarly, a lower quadrant 256 is the area between lines L2 and L3, a left-side quadrant 258 is the area between lines L3 and L4, and an upper quadrant 260 is the area between lines L4 and L1. The quadrants divide the area around the first object 252 into four equal parts.

Each quadrant represents a direction corresponding to the first object 252. The right-side quadrant 254 corresponds to the right-side direction of the first object 252, the lower quadrant 256 corresponds to a direction below the first object 252, the left-side quadrant 258 corresponds to the left side direction of the first object 252, and the upper quadrant 260 corresponds to a direction above the first object 252. The right-side quadrant 254 is associated with the right arrow key 262, the lower quadrant 256 is associated with the down arrow key 264, the left-side quadrant 258 is associated with the left arrow key 266, and the upper quadrant 260 is associated with the up arrow key 268. Therefore, if a user selects a right arrow key 262, the right-side quadrant 254 would be identified.

Each quadrant is divided into one or more segments. The segments are concentric. For example, a first or center segment of the right-side quadrant 254 is the area encompassed by the lines L1 and L2 and the curve C1. A second segment of the right-side quadrant 254 is the area encompassed by the lines L1 and L2 and the curves C1 and C2. A third segment of the right-side quadrant 254 is the area encompassed by the lines L1 and L2 and the curves C2 and C3. These segments of the right-side quadrant are concentric in that the curves C1, C2, and C3 have the same center 270 but different radii.

The curves C1, C2, and C3 are parts of circles with the same center 270. For example, the curve C1 is a quarter circle extending from the line L1 to line L2. Similarly, the curve C2 is also a quarter circle extending from the line L1 to line L2, but has a larger radius than the curve C1. If the first object represents a point, then the center 270 of the curves is the location of the first object. In another embodiment, if the first object is not a point, then this center 270 can be the center of a boundary (e.g., a rectangle) that encompasses the first object.

In one embodiment, the segments are divided such that the width of the segments is equal to the shortest of the distances between the objects. Distances between pairs of the objects can be determined and the shortest of such distances is used for the width of the segments. Consider that the distance between the object C 272 and the object H 274 is the least among distances between any other pair of the objects. This distance between the object C 272 and the object H 274 is then used as the width for the segments. Therefore, the segments have equal width. The width of the first segment of the right-side quadrant 254 is the distance between the center (e.g., first object) and the curve C1. The width of the second segment of the right-side quadrant 254 is the distance between the curve C1 and the curve C2. The width of the third segment of the right-side quadrant 254 is the distance between the curve C2 and the curve C3.

Figure 6:
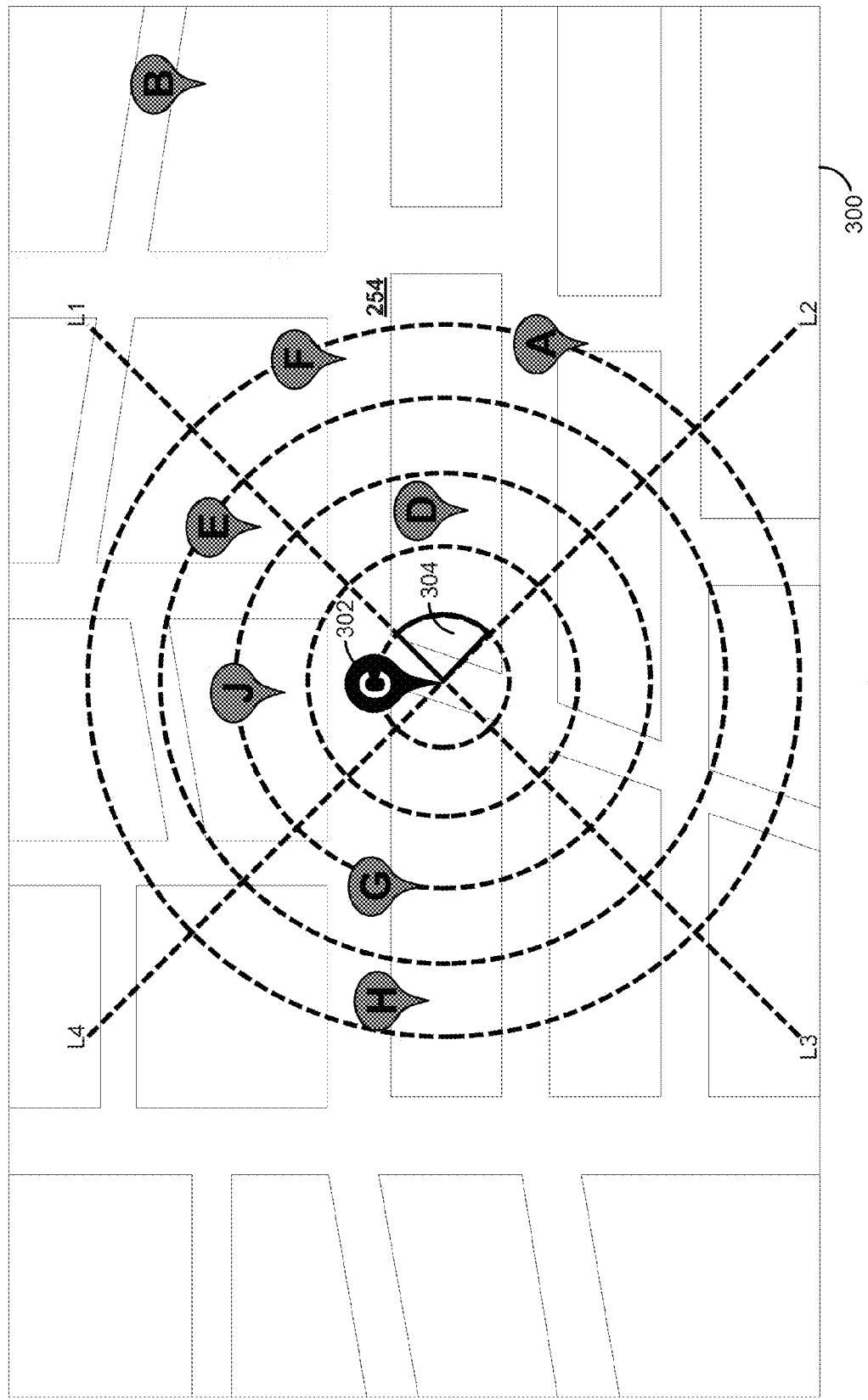
FIGS. 6-8 illustrate scanning of the segments in a quadrant to identify an object, according to one embodiment.

Referring to FIG. 6, considering the example of a map 300, the first object is a first pin 302 indicating a location. The map also includes several other pins indicating other locations. The first pin (pin 'C') 302 can be a pin that is currently selected. This selection can be a default selection when the map is first rendered based on a user request. The area around the first pin is divided into four quadrants by lines L1, L2, L3, and L4 and each quadrant is divided into segments, as explained previously.

Referring back to FIG. 4, in response to a keystroke indicating a first direction, a first quadrant corresponding to the first direction is identified at 204. The keystroke includes up, down, left, or right direction with respect to the first object. For example, referring to FIG. 6, when a user selects a right arrow key or any other key indicating a right-side direction, a right-side quadrant 254 is identified. The right-side quadrant 254 is the quadrant that corresponds to a right-side direction with respect to the first pin 302. This right-side quadrant 254 is the area between the lines L1 and L2.

Referring back to FIG. 4, once the first quadrant is identified, the segments in the first quadrant are scanned sequentially at 206. The segments are scanned to identify a second object that is closest to the first object in the first quadrant. For example, referring to FIG. 6, after the right-side quadrant 254 is identified, the segments in the right-side quadrant 254 are scanned sequentially starting from the first or center segment 304 to identify a second pin that is closest to the first pin 302. The first segment 304 is scanned first to determine if a second pin lies in the right-side quadrant 254. If the second pin represents a point, then it is determined whether that point lies within the first segment 304. In another embodiment, if the second pin or object does not represent a point, then it is determined whether a boundary of the second object overlaps with the first segment 304.

Figure 7:
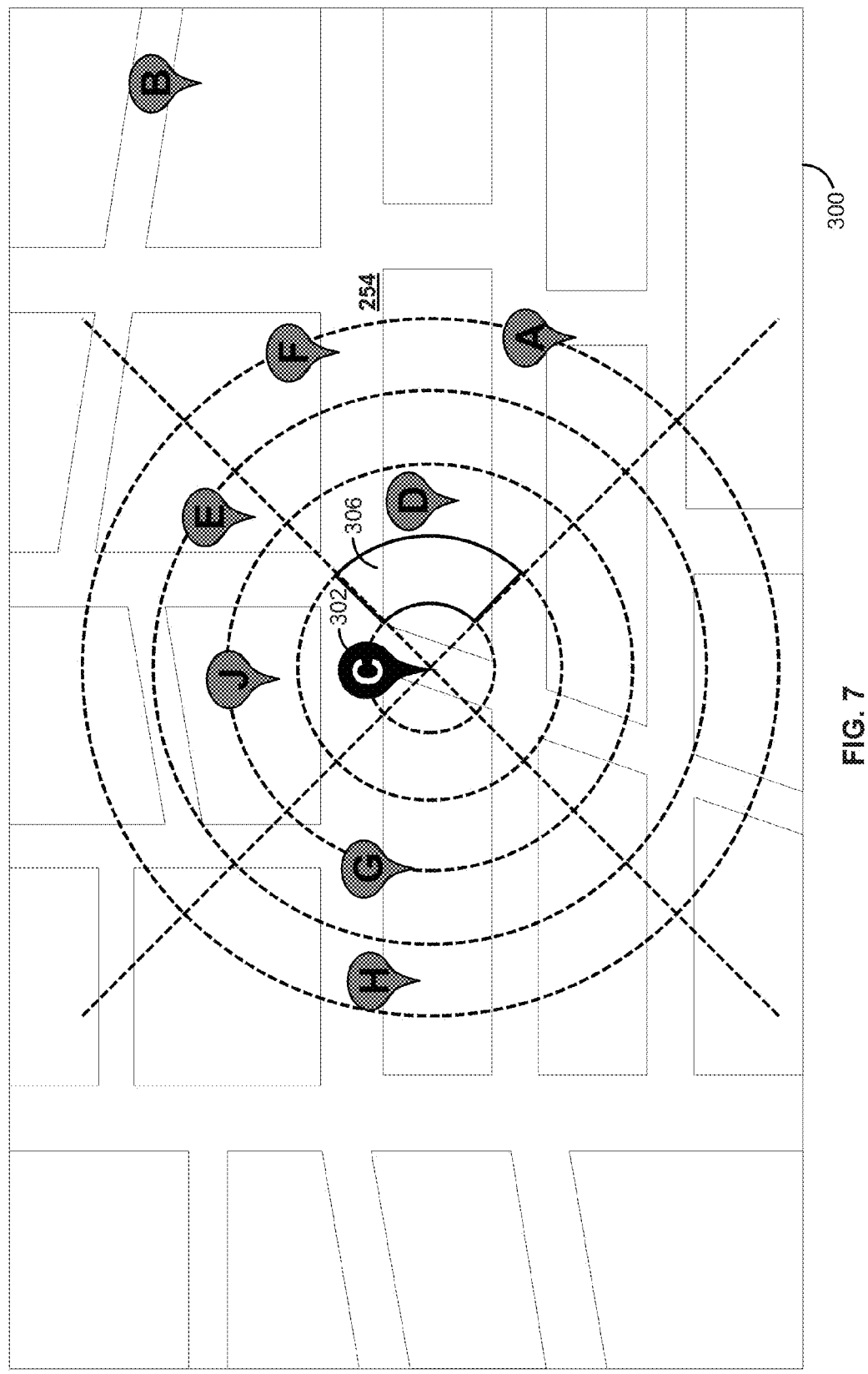
Figure 8:
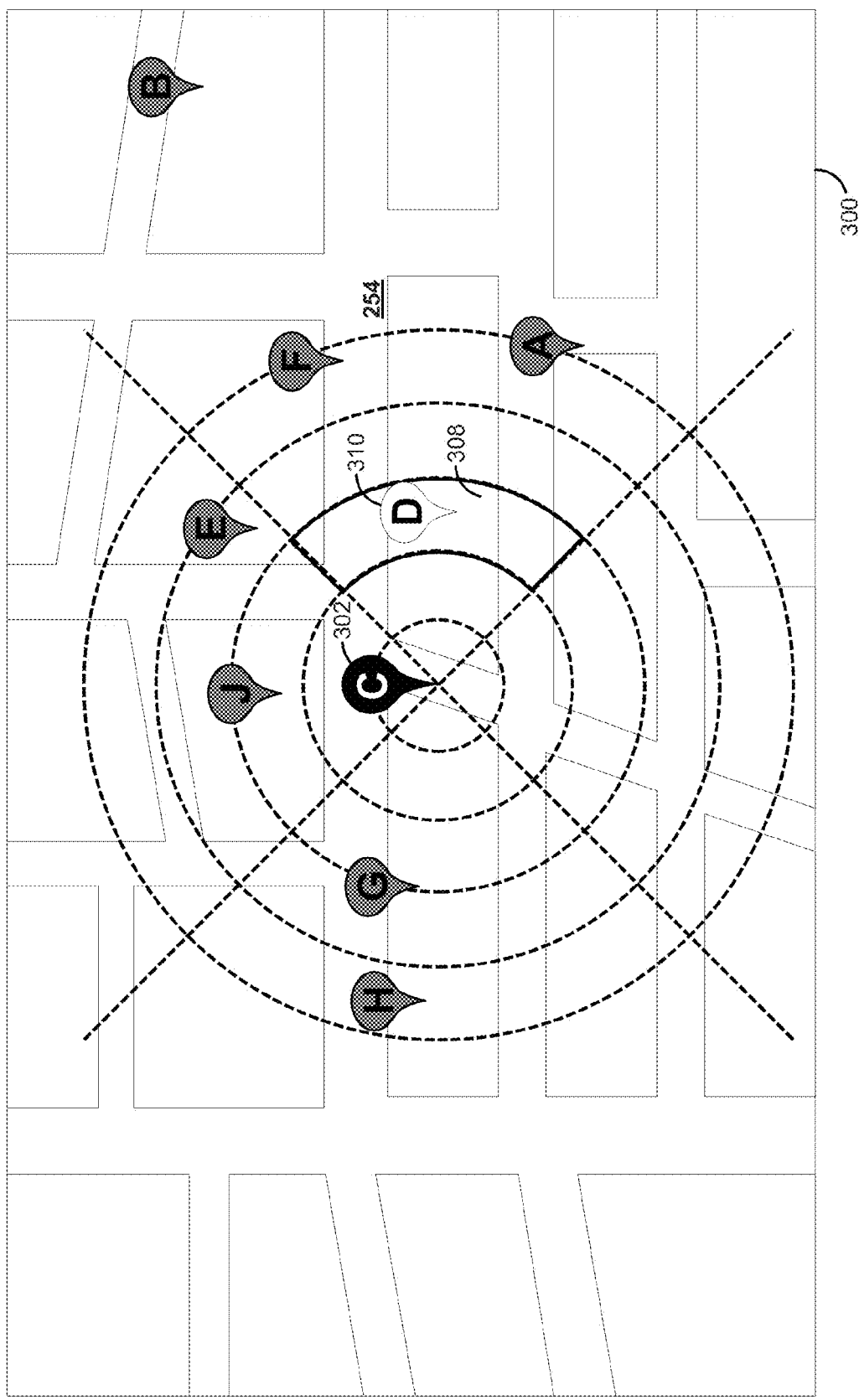
Figure 9:
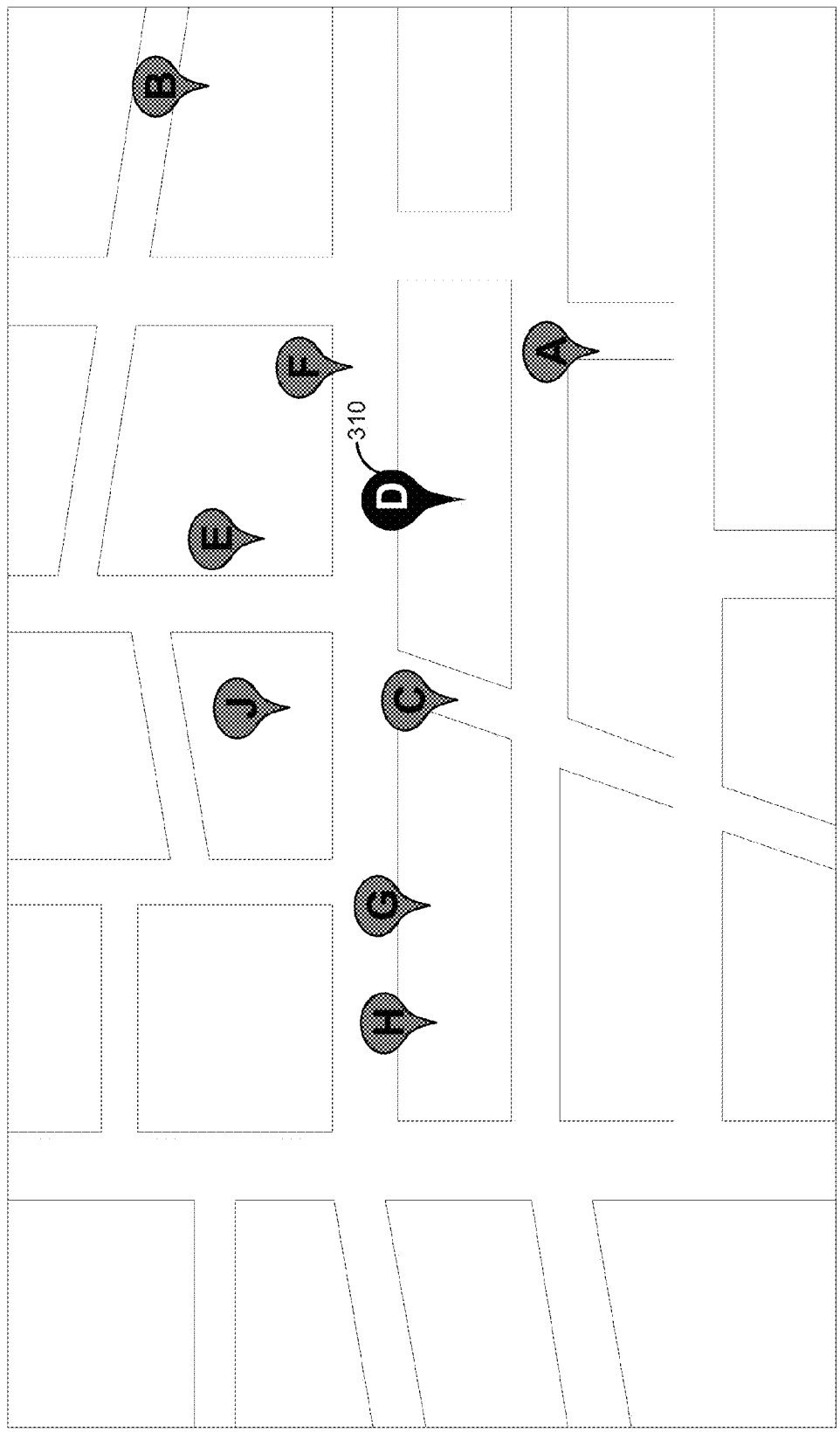
FIG. 9 illustrates selection of an object after identifying the object, according to one embodiment.

In the example of FIG. 6, the first segment 304 does not include any pins. Therefore, as shown in FIG. 7, a second segment 306 of the right-side quadrant 254 is then scanned to determine if there are any pins in the second segment 306. Since there are no pins in the second segment 306, a third segment 308 is then scanned as shown in FIG. 8. The second pin 310 lies in the third segment 308 and is therefore identified. This second pin 310 is closest to the first pin 302 in the right-side quadrant 254. Referring back to FIG. 4, once identified, the second pin 310 is selected at 208. This selection can be represented by changing a display attribute such as color, size, etc., of the second pin 310, as shown in FIG. 9.

Figure 10:
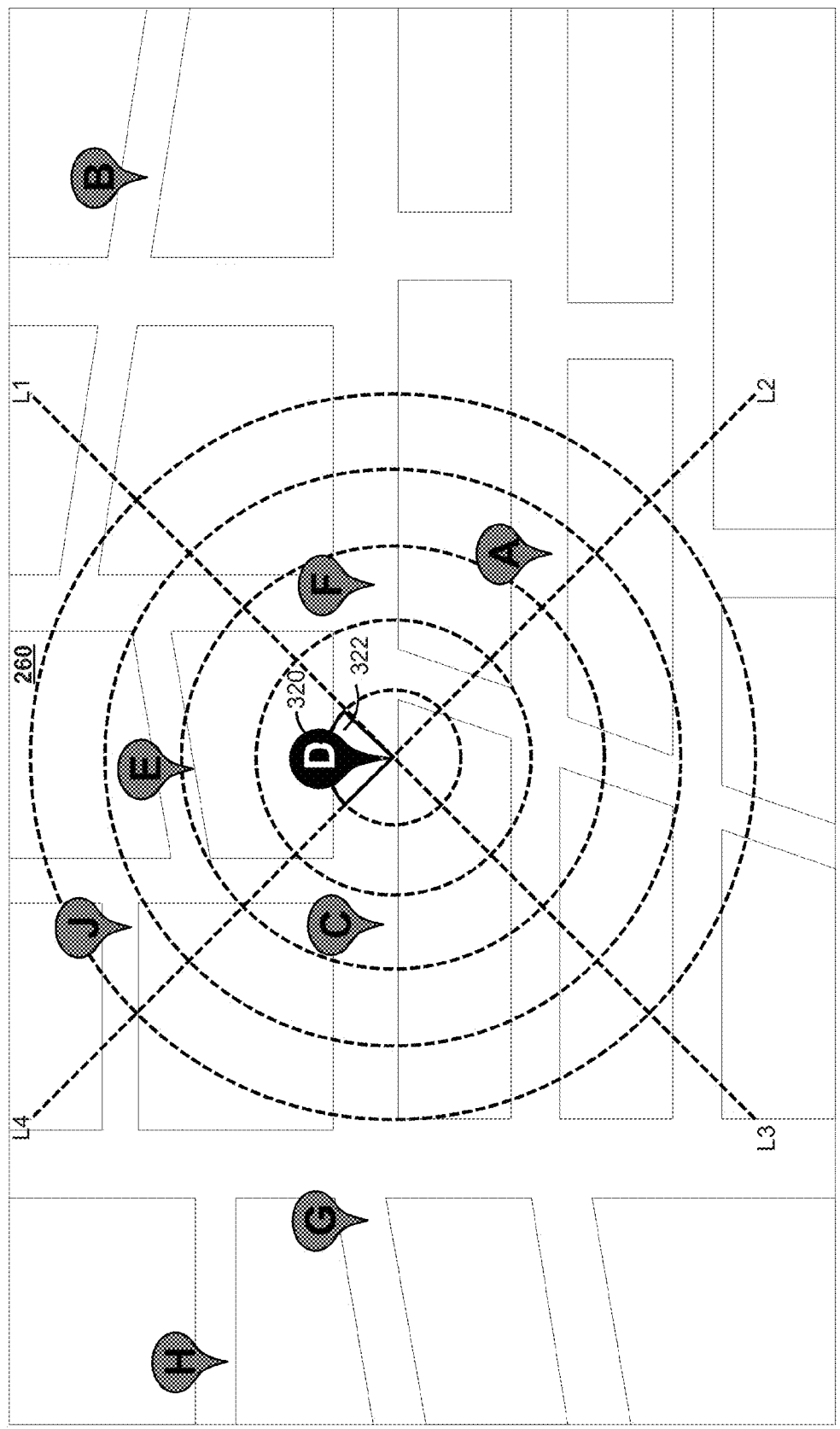
FIGS. 10-13 illustrate scanning of the segments in another quadrant to identify and select an object, according to one embodiment.
Figure 11:
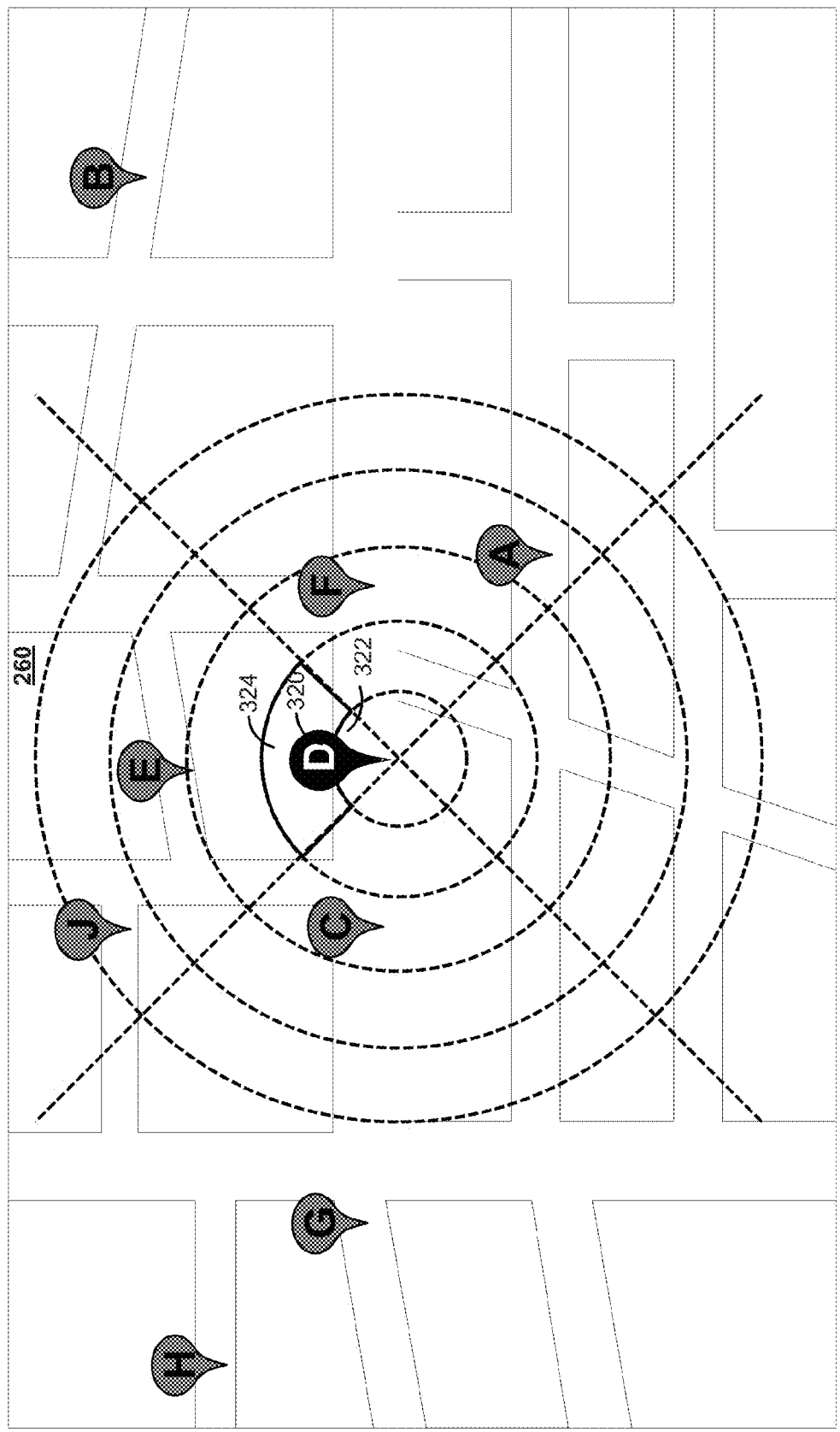
Figure 12:
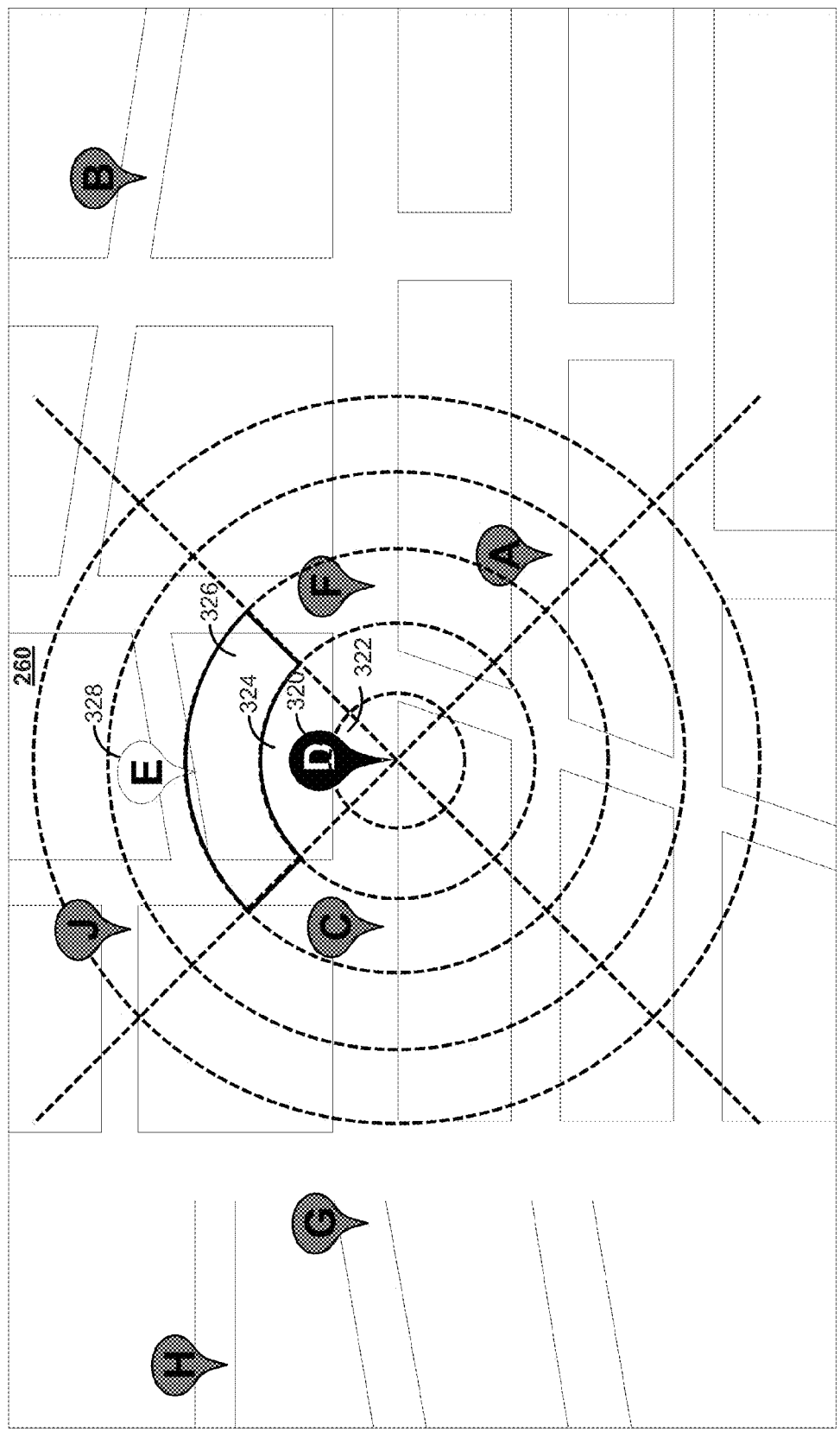
Figure 13:
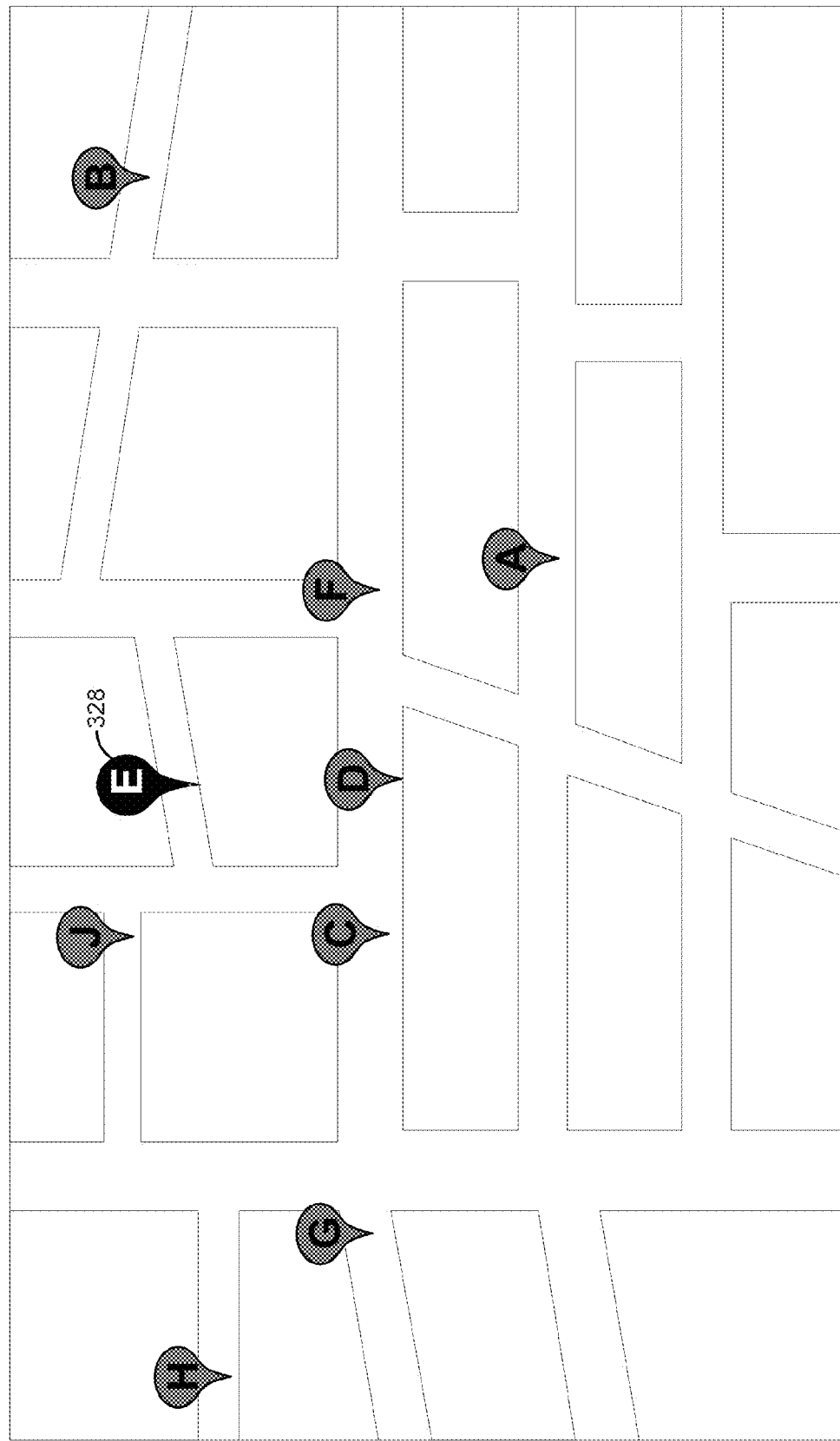

As another example, if a user selects an up arrow key, then an upper quadrant 260 is identified as shown in FIG. 10. The upper quadrant 260 is the area above the first object 320 between lines L4 and L1. The first segment 322 of the upper quadrant 260 is scanned to determine if there a second pin within the first segment 322. Since the first segment 322 does not include any pin, a second segment 324 is then scanned, as shown in FIG. 11. The second segment 324 also does not include any pin. Therefore, the third segment 326 is then scanned, as shown in FIG. 12. The second pin 328 lies in the third segment 326 and is identified. This second pin 328 is closest to the first pin 320 in the upper quadrant 260. Following, which the second pin 328 is selected and this selection is represented on the user interface, as shown in FIG. 13.

Figure 14:
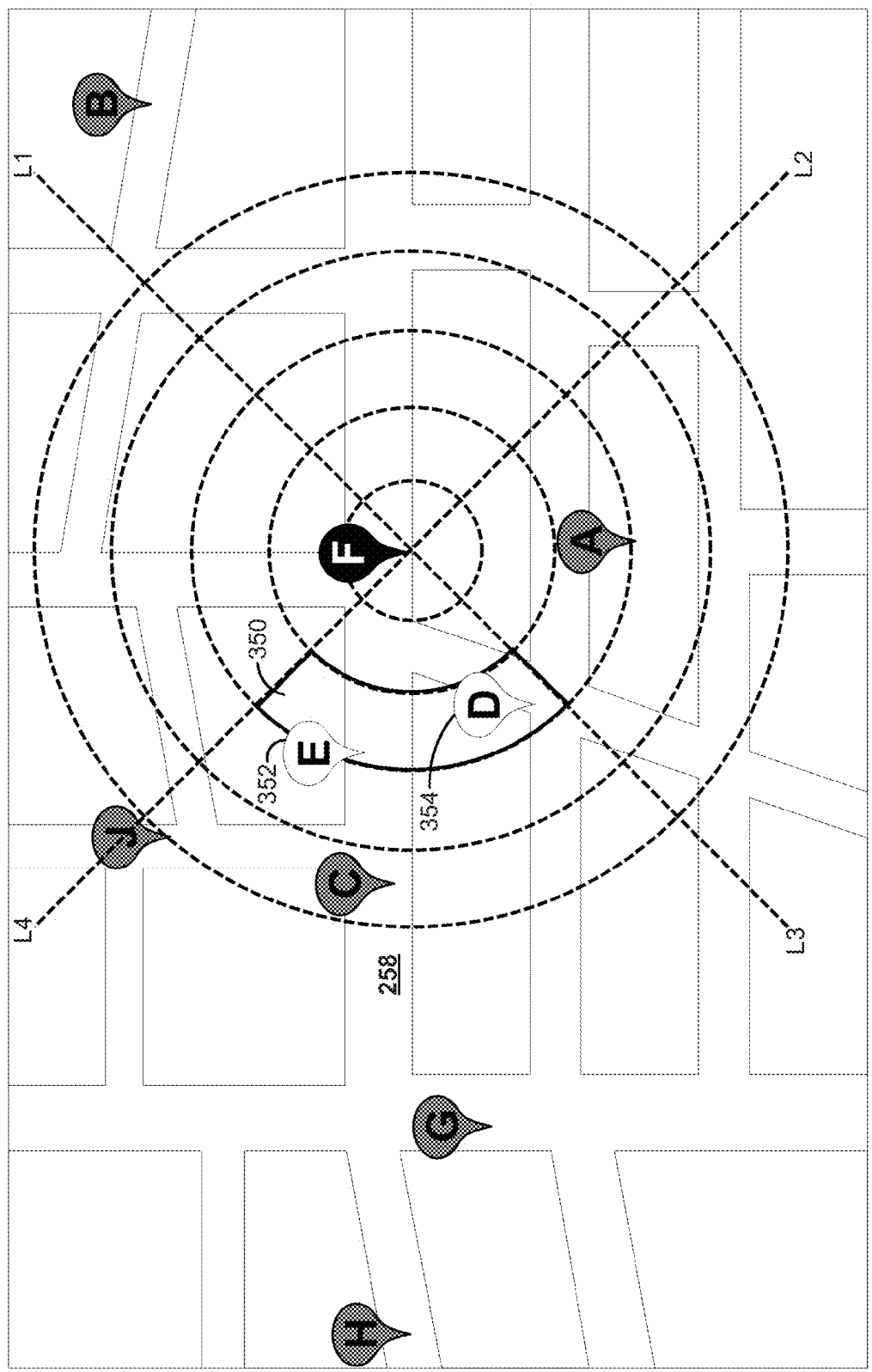
FIGS. 14-16 illustrate division of a segment and identification of an object when there are multiple objects in the segment, according to one embodiment.
Figure 15:
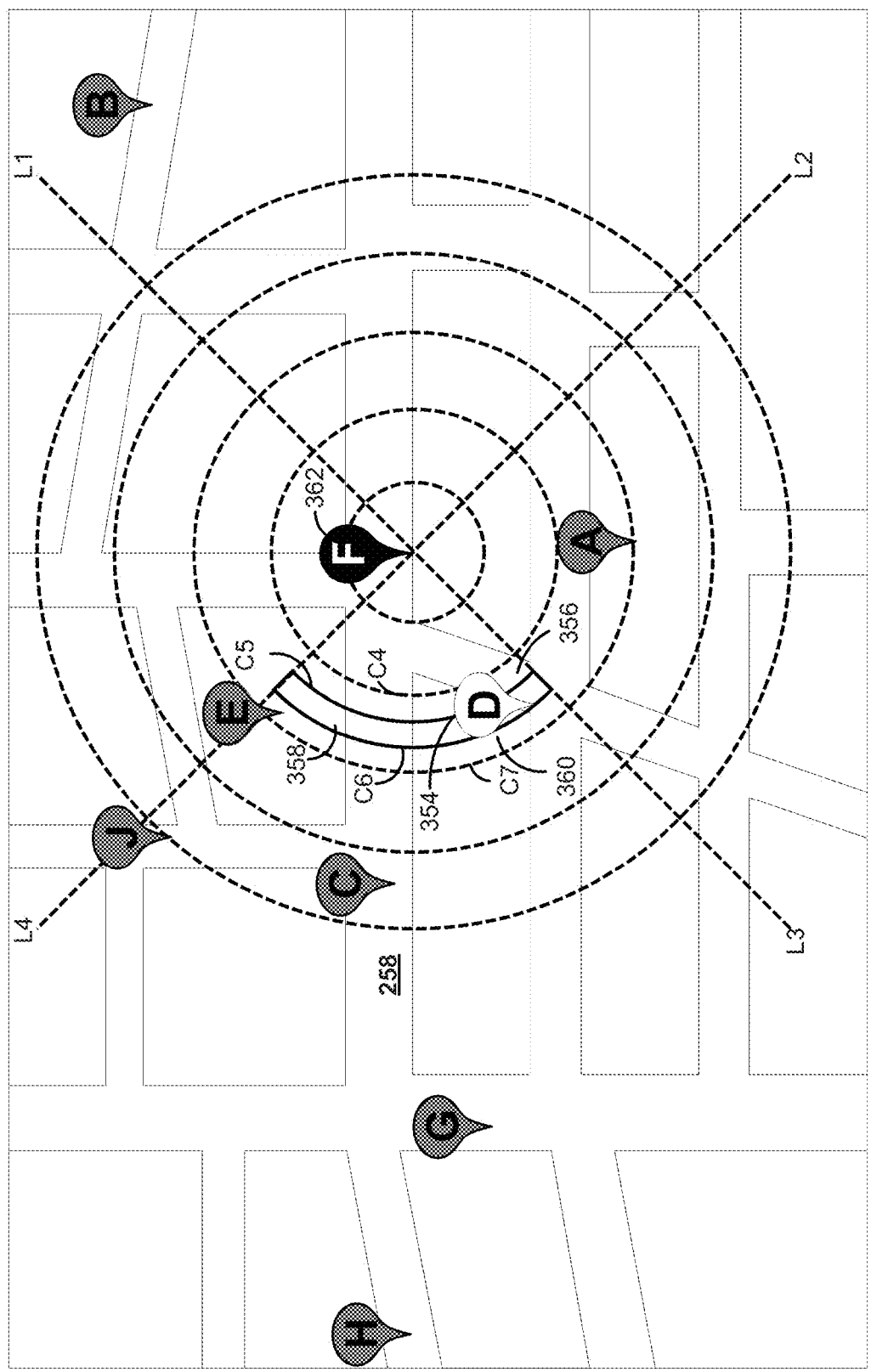
Figure 16:
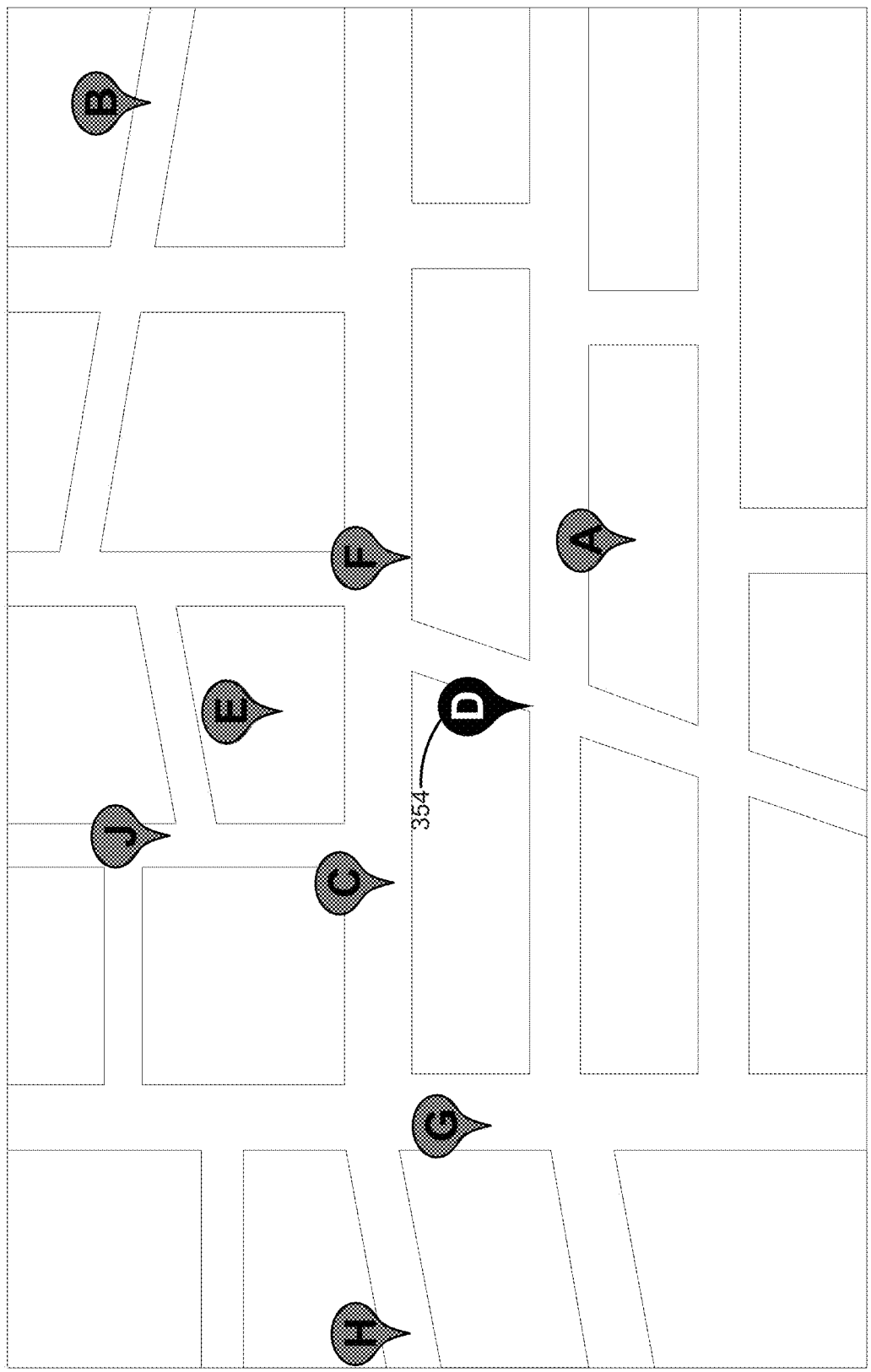

There can be scenarios in which a segment includes multiple objects. In such scenarios, the segment including multiple pins is divided into smaller segments. For example, referring to FIG. 14, the third segment 350 of the left-side quadrant 258 includes two pins, namely, pin E 352 and pin D 354. The third segment 350 is concentrically divided into three segments as shown in FIG. 15. The third segment 350 is the area defined between the curves C4 and C7 and the lines L3 and L4. A first divided segment 356 is the area defined between the curves C4 and C5 and the lines L3 and L4. A second divided segment 358 is the area defined between the curves C5 and C6 and the lines L3 and L4. A third divided segment 360 is the area defined between the curves C6 and C7 and the lines L3 and L4. Curves C4, C5, C6 and C7 are concentric. These divided segments 356, 358, and 360 are then scanned sequentially to identify the second pin that is closest to the first pin 362 in the left-side quadrant 258. The first divided segment 356 does not include any pins. Therefore, the second divided segment 358 is then scanned. The second pin 354, i.e. pin D, is in the second divided segment 358. The second pin 354 is therefore identified and selected as shown in FIG. 16.

Figure 17:
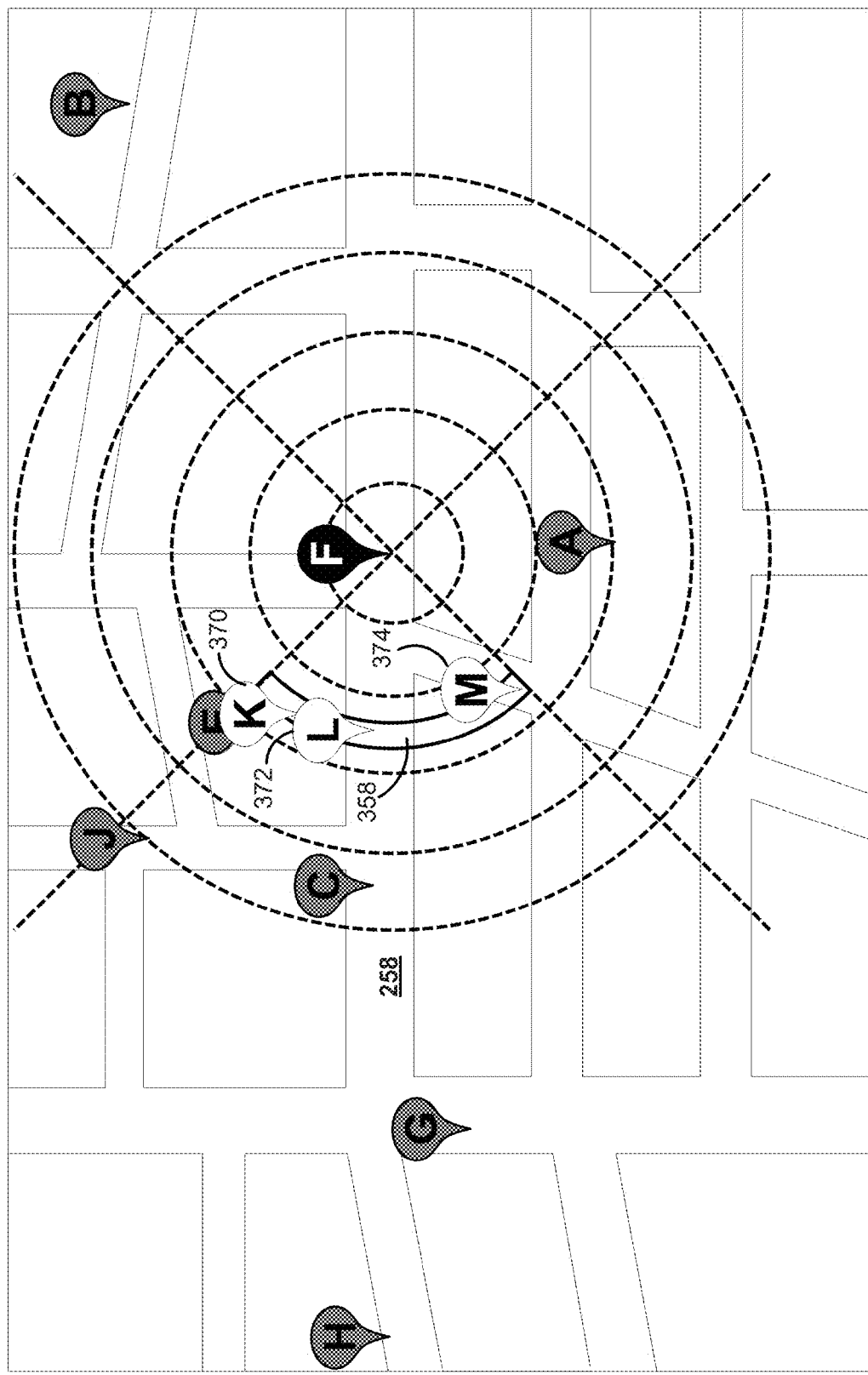
FIGS. 17-19 illustrate identification of an object when there are multiple objects in a divided segment, according to one embodiment.
Figure 18:
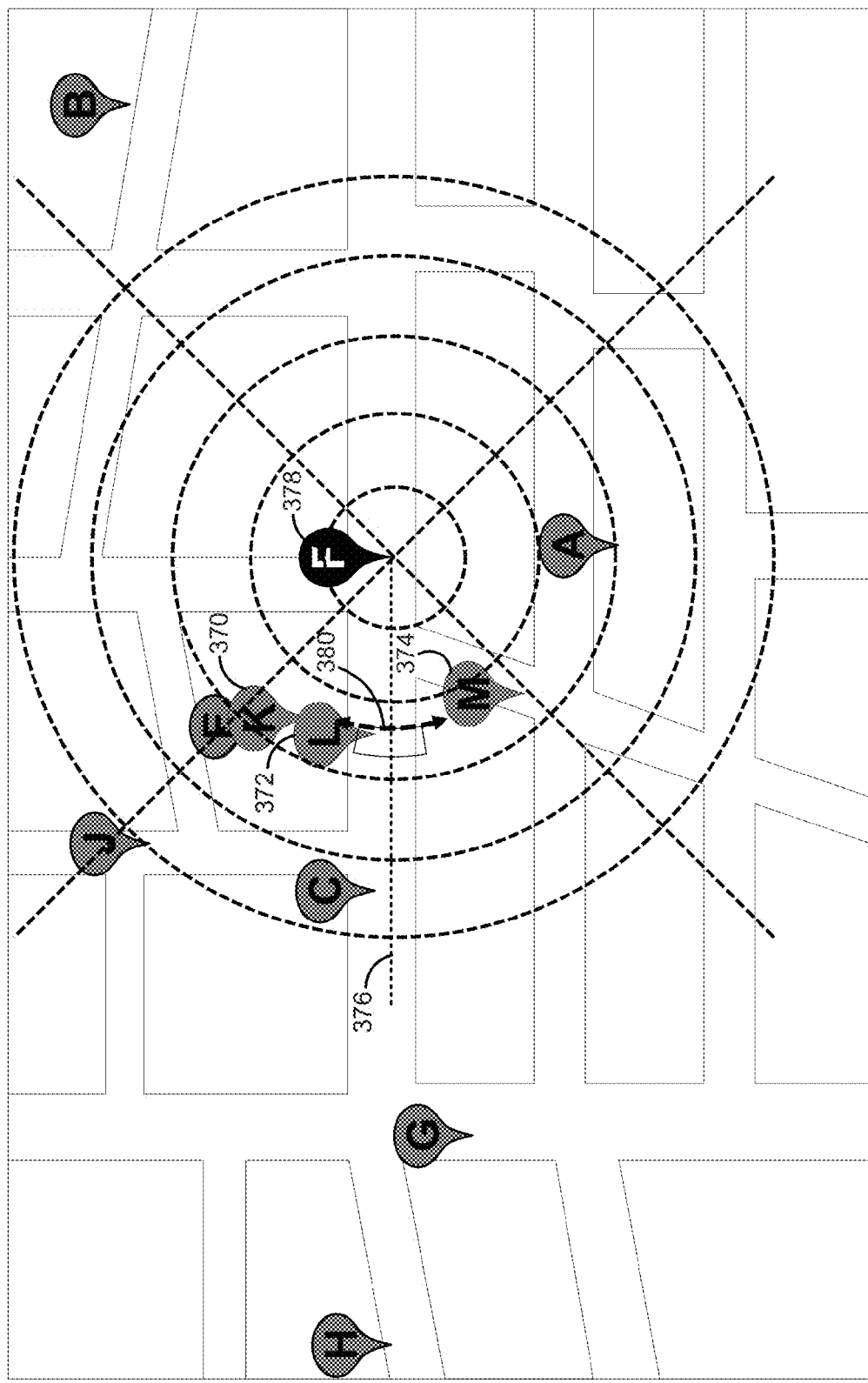
Figure 19:
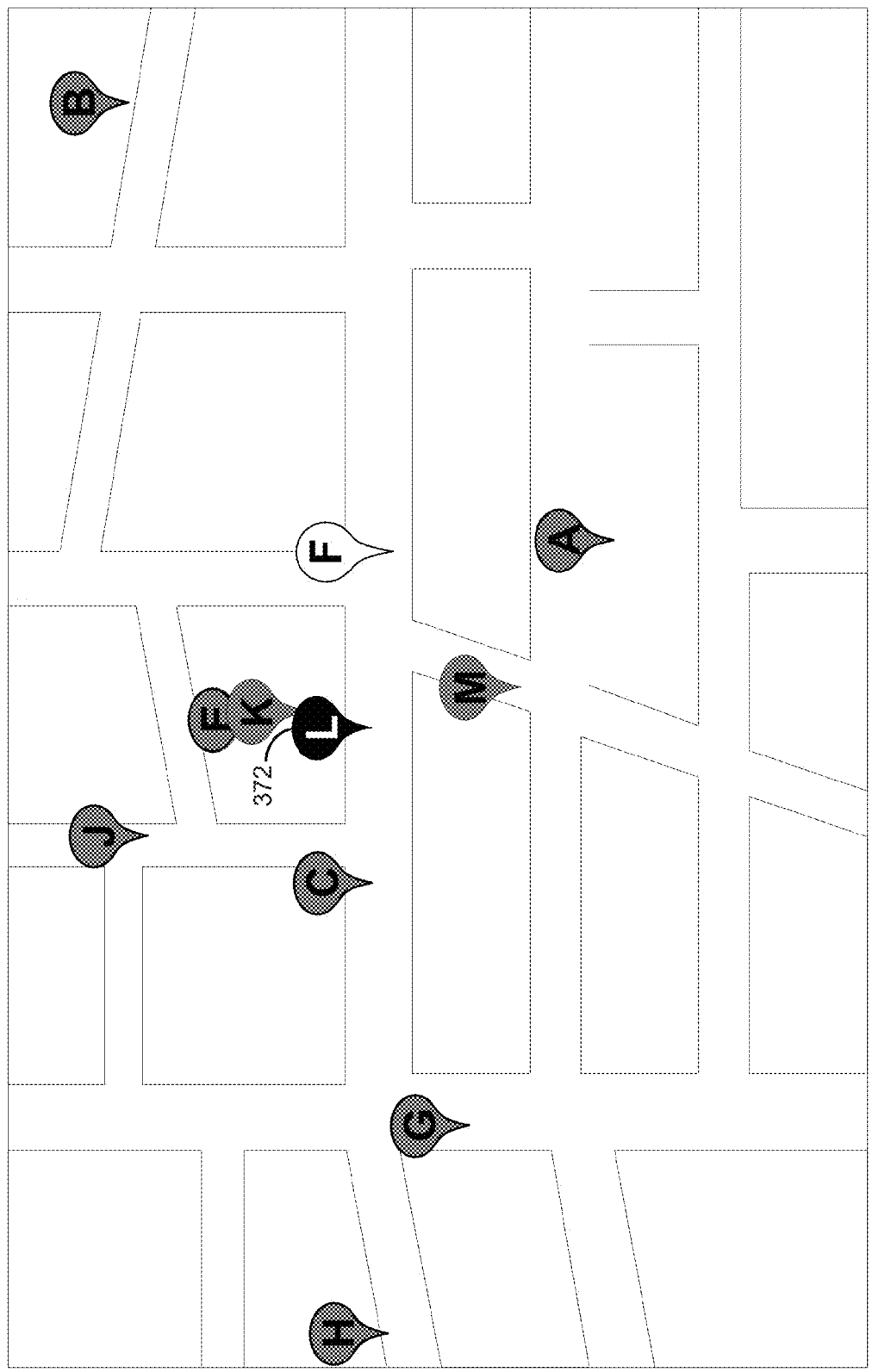

Referring to FIG. 17, in one embodiment, even after dividing a segment, a divided segment can included more than one object. For example, the second divided segment 358 of the left-side quadrant 258 includes pin K 370, pin L 372, and pin M 374. In such cases, referring to FIG. 18, a center line 376 that divides the left-side quadrant 258 is used as a reference for selecting a second pin that is closest to the first pin F 378 in the left-side quadrant 258. A pin that is in the second divided segment 358 and closest to the center line 376 is identified as the second pin. Pin L 372 is the closest to the center line 376 and is therefore selected as the second pin. In one embodiment, the second pin 372 is the pin that has the least circle-distance from the center line 376. In another embodiment, the divided segment in which the pins lie is scanned from the center line 376 (as represented by the shaded region) along the curvature 380 of the divided segment until a pin is encountered. The first encountered pin is the second pin 372. The selection of the second pin 372 is then presented on the user interface as shown in FIG. 19.

Figure 20:
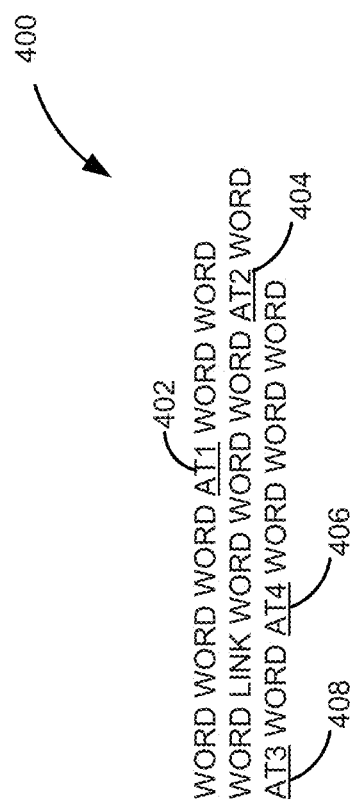
FIG. 20 illustrates an example of a feed update with active text objects.
Figure 21:
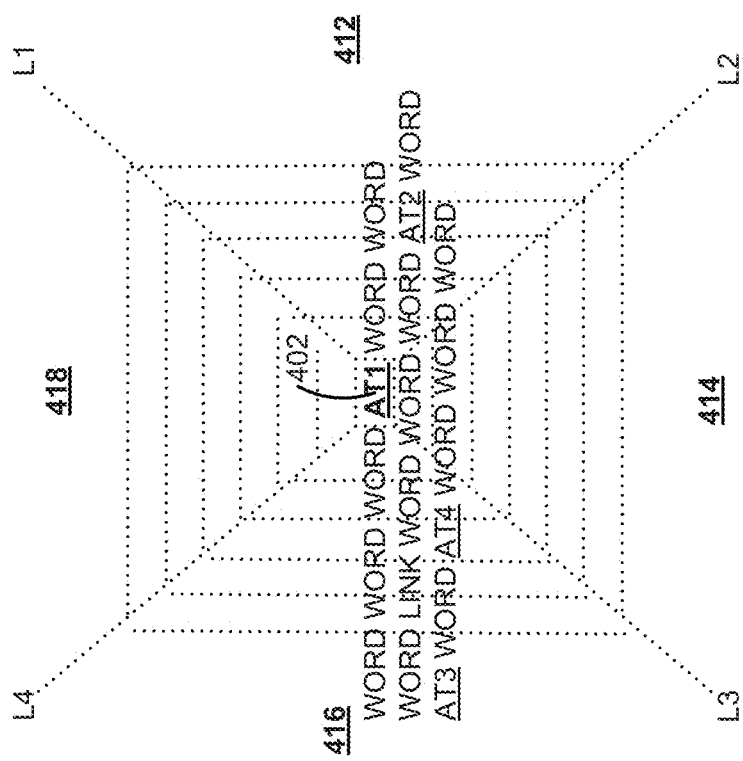
FIG. 21 illustrates quadrants and segments, according to another embodiment.

Some unstructured environments can include active text objects. An example of such environments is a feed update 400 as shown in FIG. 20. The feed update 400 includes active text objects 402, 404, 406, and 408 along with other text. The active text objects 402-408 are not in a grid-type arrangement and a user has to typically use a mouse to select an active text object. The active text objects 402-408 can be links. The feed update can also one or more visual objects to perform actions such as to flag, set as favorite, like/dislike, etc. The keyboard-based navigation method 200 described above in reference to map environment can be similarly used to navigate between the active text objects 402-408. The area around a first active text object 402 is divided into four equal quadrants, with the first active text object 402 as the center, as shown in FIG. 21. The first active text object 402 can be the active text object that occurs first in the feed update 400. The quadrants are defined by lines L1, L2, L3, and L4 that originate from the first active text object. The central angle of each quadrant is 90 degrees. The right-side quadrant 412 is the area between lines L and L2, the lower quadrant 414 is the area between lines L2 and L3, the left-side quadrant 416 is the area between lines L3 and L4, and the upper quadrant 418 is the area between lines L4 and L1.

The right-side quadrant 412 corresponds to the right-side direction of the first object 402, the lower quadrant 414 corresponds to a direction below the first object 402, the left-side quadrant 416 corresponds to the left side direction of the first object 402, and the upper quadrant 418 corresponds to a direction above the first object 402. The right-side quadrant 412 is associated with a right arrow key, the lower quadrant 414 is associated with a down arrow key, the left-side quadrant 416 is associated with a left arrow key, and the upper quadrant 418 is associated with an up arrow key.

Figure 22:
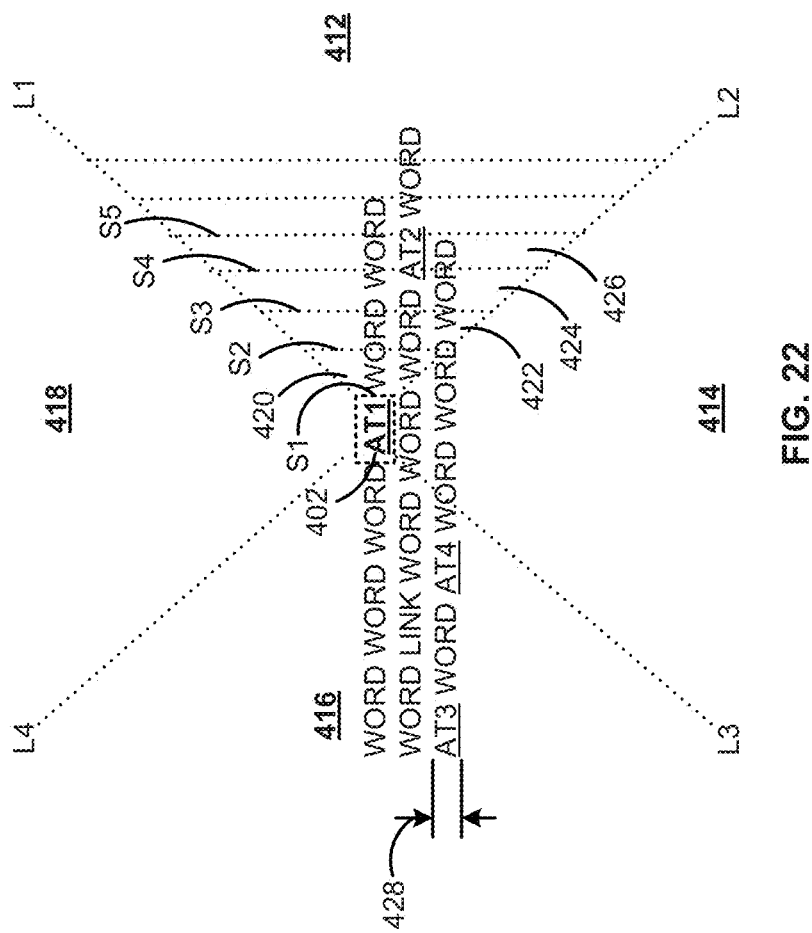

Each quadrant is divided into one or more segments. The segments in each quadrant are parallel. For example, referring to FIG. 22, a first segment 420 of the right-side quadrant 412 is the area defined by the lines L1, L2, S1, and S2. A second segment 422 of the right-side quadrant 412 is the area encompassed by the lines L1, L2, S2, and S3. A third segment 424 of the right-side quadrant 412 is the area encompassed by the lines L1, L2, S3, and S4. A fourth segment 426 of the right-side quadrant 412 is the area encompassed by the lines L1, L2, S4, and S5. The lines S1 to S5 are parallel. In one embodiment, the segments are divided such that the width of the segments is equal to the line height 428 of the text objects in the feed update.

Figure 23:
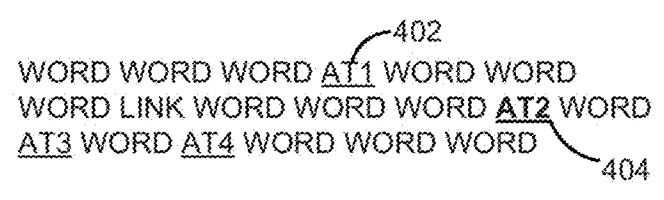

When a user selects a right arrow key, the right-side quadrant 412 is identified. The first segment 420 is scanned first to determine if a second active text object lies in the right-side quadrant 412. Since the first segment 420 does not include any active text objects, the second segment 422 is then scanned. Since there are no active text objects in the second segment 422, the third segment 424 is then scanned. The second active text object 404 lies in the third segment 424 and is therefore identified. The second active text object 404 is then selected, as shown in FIG. 23.

Figure 24:
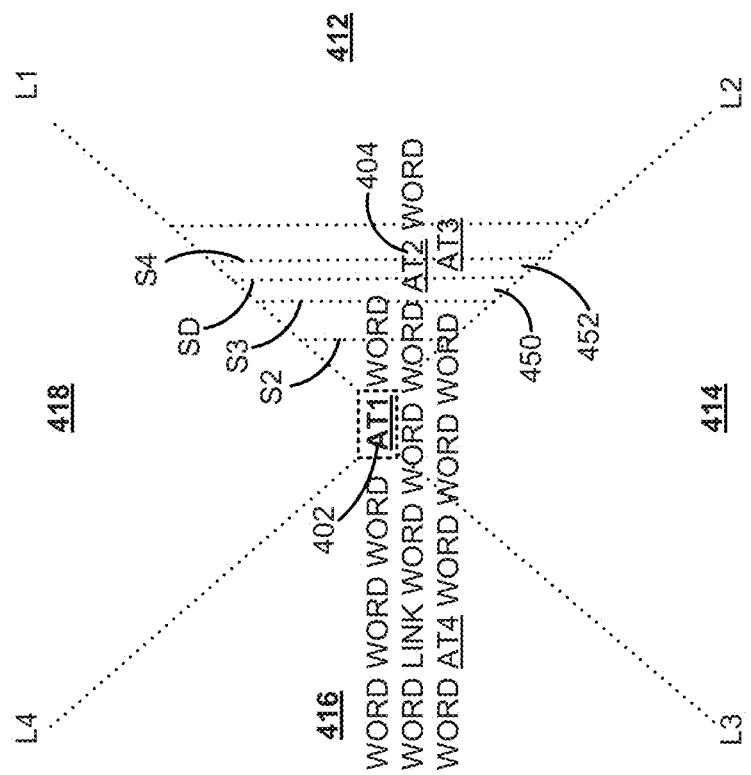
FIG. 24 illustrate division of a segment when there are multiple active text objects in the segment, according to one embodiment.

If a segment includes multiple active text objects, then the segment is divided into smaller segments. For example, referring to FIG. 24, the third segment 424 of the right-side quadrant 412 includes two active text objects. The third segment is divided into two segments. A first divided segment 450 is the area defined between the lines S3 and SD and the lines L1 and L2. A second divided segment 452 is the area defined between the lines SD and S4 and the lines L1 and L2. These divided segments 450 and 452 are scanned sequentially to identify an active text object that is closest to the first active text object 402 in the right-side quadrant 412. The first divided segment 450 includes the second active text object 404, which is therefore identified and selected.

Figure 25:
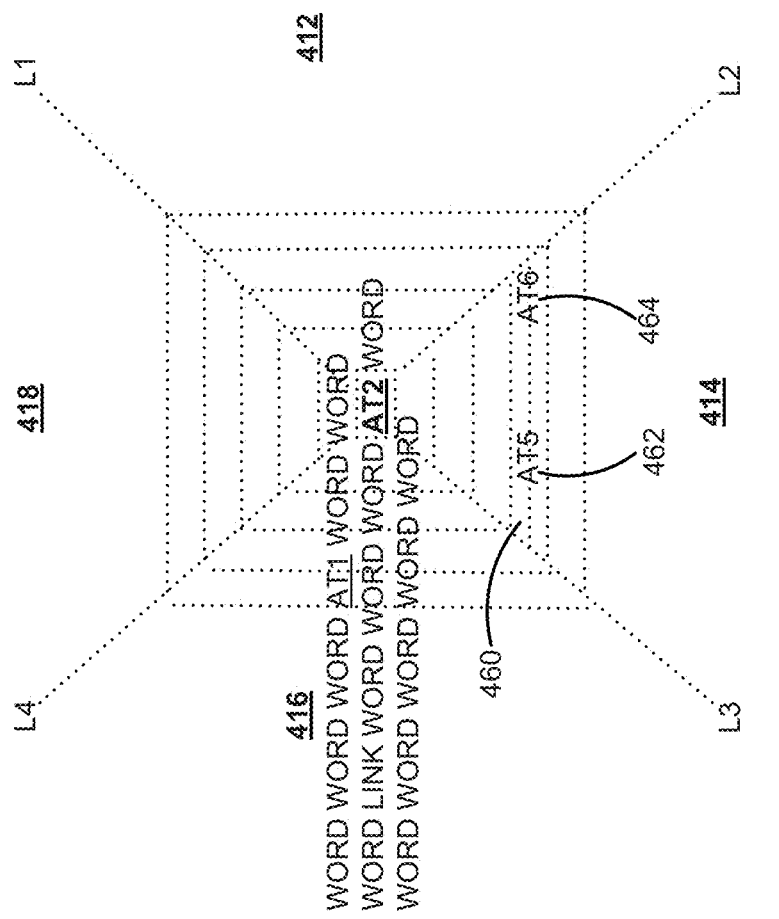
FIGS. 25 and 26 illustrate identification of an active text object when there are multiple active text objects in a divided segment, according to one embodiment
Figure 26:
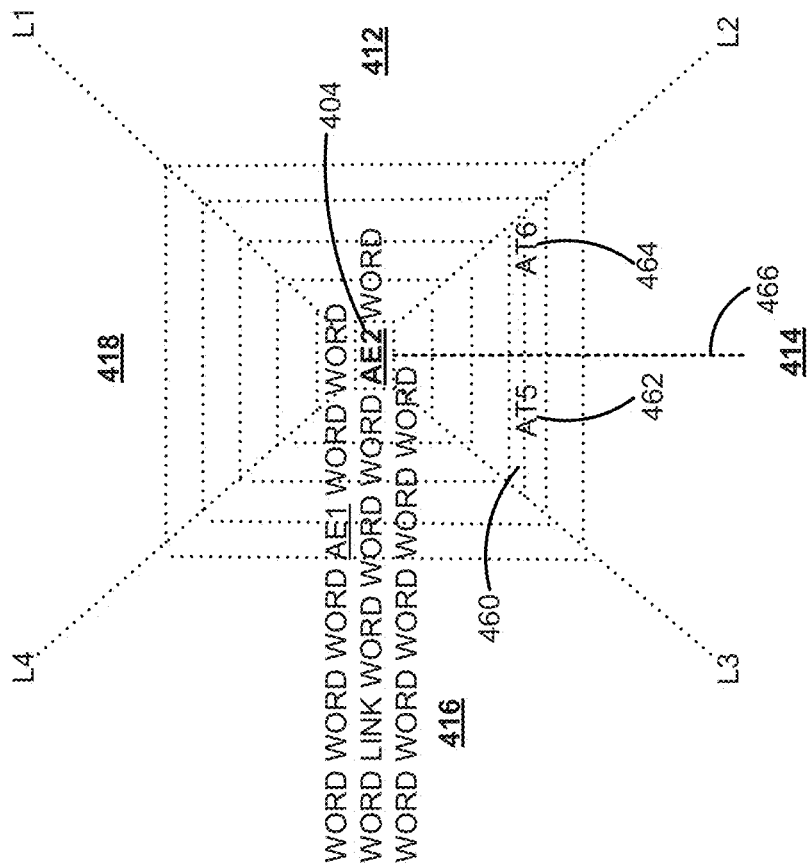

Referring to FIG. 25, in one embodiment, even after dividing a segment, a divided segment can included more than one active text object. For example, a divided segment 460 of the lower quadrant 414 includes two active text objects 462 and 464. In such cases, referring to FIG. 26, a center line 466 that divides the left-side quadrant 414 is used as a reference for selecting a second active text object that is closest to the first active text object 404 in the left-side quadrant 414. An active text object that is in the divided segment 460 and closest to the center line 466 is identified as the second active text object. The active text object AT5 462 is the closest to the center line 466 and is therefore selected as the second active text object. In one embodiment, if there are multiple active text objects within same distance from the center line, left most of the active text objects is identified as the second active text object. For example, if the active text objects AT5 462 and AT6 464 are within the same distance from the center line 466, then the active text object AT5 462 is selected because it is the left most.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 27:
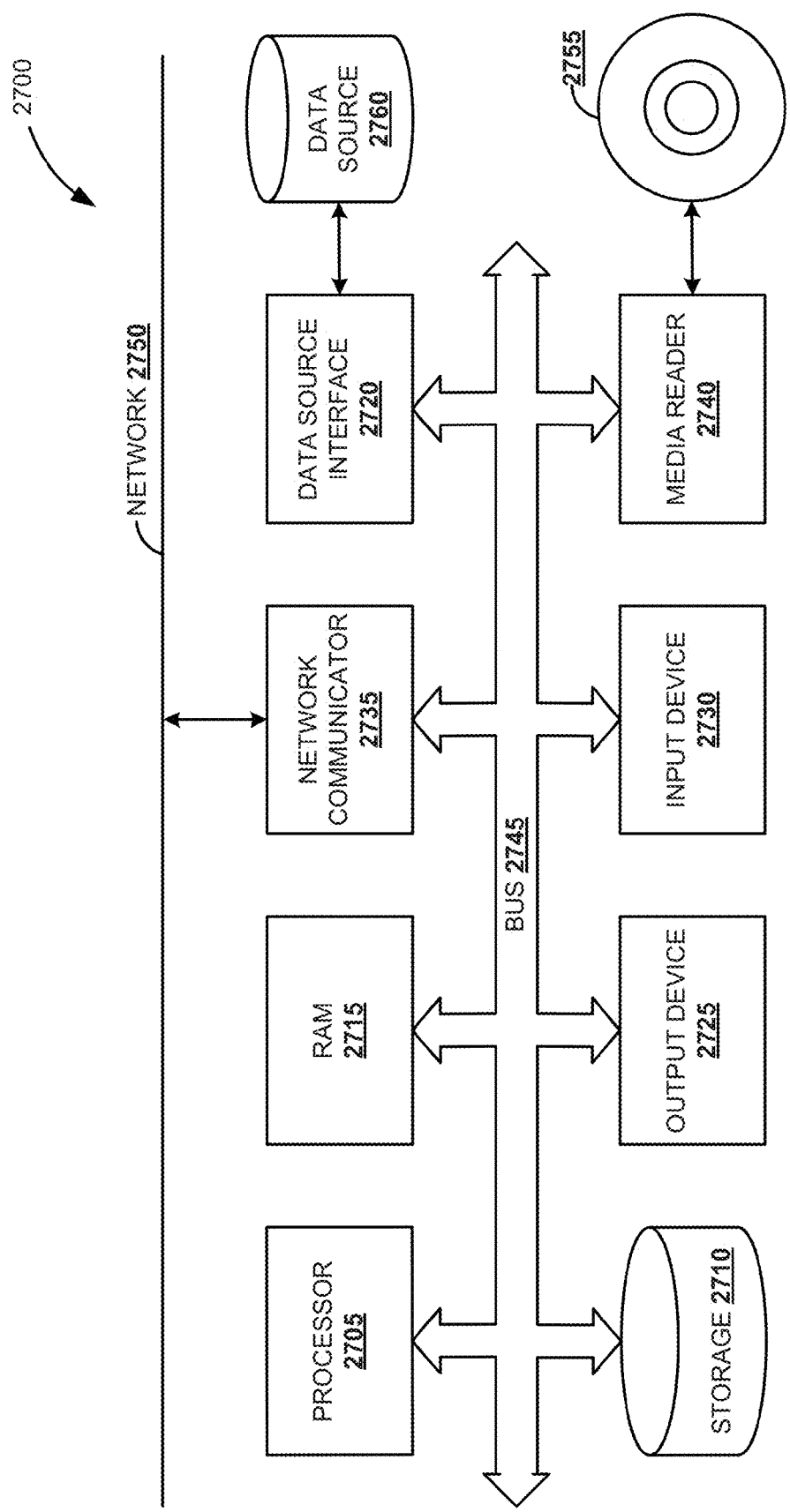
FIG. 27 is a block diagram of an exemplary computer system according to one embodiment.

FIG. 27 is a block diagram of an exemplary computer system 2700. The computer system 2700 includes a processor 2705 that executes software instructions or code stored on a computer readable storage medium 2755 to perform the above-illustrated methods of the invention. The computer system 2700 includes a media reader 2740 to read the instructions from the computer readable storage medium 2755 and store the instructions in storage 2710 or in random access memory (RAM) 2715. The storage 2710 provides a large space for keeping static data where at least some instructions could be stored for later execution. The stored instructions may be further compiled to generate other representations of the instructions and dynamically stored in the RAM 2715. The processor 2705 reads instructions from the RAM 2715 and performs actions as instructed. According to one embodiment of the invention, the computer system 2700 further includes an output device 2725 (e.g., a display) to provide at least some of the results of the execution as output including, but not limited to, visual information to users and an input device 2730 to provide a user or another device with means for entering data and/or otherwise interact with the computer system 2700. Each of these output devices 2725 and input devices 2730 could be joined by one or more additional peripherals to further expand the capabilities of the computer system 2700. A network communicator 2735 may be provided to connect the computer system 2700 to a network 2750 and in turn to other devices connected to the network 2750 including other clients, servers, data stores, and interfaces, for instance. The modules of the computer system 2700 are interconnected via a bus 2745. Computer system 2700 includes a data source interface 2720 to access data source 2760. The data source 2760 can be accessed via one or more abstraction layers implemented in hardware or software. For example, the data source 2760 may be accessed by network 2750. In some embodiments the data source 2760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
    divide an area around a first object displayed on a user interface including a plurality of objects, into quadrants and a plurality of concentric segments within at least one of the quadrants, wherein the quadrants represent directions with respect to the first object, and the quadrants and concentric segments are displayed on the user interface;
    in response to an input indicating a first direction, identify a first one of the quadrants corresponding to the first direction;
    scan segments of the first quadrant to identify a second object that is closest to the first object in the first quadrant, wherein:
        when there are multiple objects in a segment of a first quadrant, concentrically divide the segment of the first quadrant to subsegments and display the subsegments on the user interface; and
        sequentially scan the subsegments, starting from a subsegment that is closest to the first object, to identify the second object that is closest to the first object, wherein the second object is within one of the subsegments, wherein sequentially scan the subsegments includes:
            when there is a plurality of objects in the subsegment, identify the second object that is closest to a center line dividing the first quadrant; and
            when there are multiple objects from the plurality of objects within same distance from the center line in the subsegment, identify the second object that is left most of the multiple objects from the plurality of objects within same distance from the center line; and
    select the second object, wherein the second object is within the segment of the first quadrant.

2. The article of manufacture of claim 1, wherein the segments of the quadrants are concentric and the instructions to scan the segments of the first quadrant comprises instructions to:
    scan the segments sequentially from a center segment.

3. The article of manufacture of claim 1, further comprising instructions which when executed by the computer further causes the computer to:
    when there are multiple objects from the plurality of objects within same distance from the center line in the subsegment, identify the second object that is topmost of the multiple objects from the plurality of objects.

4. The article of manufacture of claim 2, wherein the segments are divided such that the width of the segments is equal to the shortest of the distances between the plurality of the objects.

5. The article of manufacture of claim 1, wherein the segments of the first quadrant are parallel and the instructions to scan the segments of the first quadrant comprises instructions to:
    scan the segments sequentially starting from a center segment, wherein the first object and the second object comprise text.

6. The article of manufacture of claim 5, wherein the segments are divided such that the width of the segments is equal to line height of the text.

7. The article of manufacture of claim 1, wherein the first direction includes an up direction, a down direction, a left direction, or a right direction.

8. A computer-implemented method for keyboard-based navigation, the method comprising:
    dividing an area around a first object displayed on a user interface including a plurality of objects into quadrants and a plurality of concentric segments within at least one of the quadrants, wherein the quadrant represent directions with respect to the first object, and the quadrant and concentric segments are displayed on the user interface;
    in response to an input indicating a first direction, identifying a first one of the quadrants corresponding to the first direction;
    scanning segments of the first quadrant to identify a second object that is closest to the first object in the first quadrant, wherein:
        when there are multiple objects in a segment of the first quadrant, concentrically dividing the segment of the first quadrant to subsegments and display the subsegments on the user interface; and
        sequentially scanning the subsegments, starting from a subsegment that is closest to the first object, to identify the second object that is closest to the first object, wherein the second object is within one of the subsegments, wherein sequentially scan the subsegments includes:
            when there is a plurality of objects in the subsegment, identify the second object that is closest to a center line dividing the first quadrant; and
            when there are multiple objects from the plurality of objects within same distance from the center line in the subsegment, identify the second object that is left most of the multiple objects from the plurality of objects within same distance from the center line; and
    selecting the second object, wherein the second object is within the segment of the first quadrant.

9. The method of claim 8, wherein the segments of the quadrants are concentric and scanning the segments of the first quadrant comprises:
    scanning the segments sequentially starting from a center segment.

10. The method of claim 8, further comprising:
    when there are multiple objects from the plurality of objects within same distance from the center line in the subsegment, identifying the second object that is topmost of the multiple objects from the plurality of objects.

11. The method of claim 8, wherein the segments of the quadrants are concentric and dividing the area around the first object into the quadrants comprises:

dividing the area around the first object into four quadrants.

12. The method of claim 11, wherein the segments are divided such that the width of the segments is equal to the shortest of the distances between the plurality of the objects.

13. The method of claim 8, wherein the segments of the first quadrant are parallel and scanning the segments of the first quadrant comprises:

scanning the segments sequentially starting from a center segment, wherein the first object and second object comprise text.

14. The method of claim 8, wherein the segments are divided such that the width of the segments is equal to line height of the text.

15. The method of claim 8, wherein the first direction includes an up direction, a down direction, a left direction, or a right direction.

16. A computer system for keyboard-based navigation, comprising:

a computer memory to store program code; and a processor to execute the program code to:

divide an area around a first object displayed on a user interface including a plurality of objects into quadrants and a plurality of concentric segments within at least one of the quadrants, wherein the quadrants represents directions with respect to the first object, and the quadrants and concentric segments are displayed on the user interface;

in response to an input indicating a first quadrant to identify a second object that is closest to the first object in the first quadrant;

scan segments of the first quadrant to identity a second object that is closest to the first object in the first quadrant, wherein:

when there are multiple objects in a segment of the first quadrant, concentrically divide the segment of the first quadrant to subsegments and display the subsegments on the user interface; and sequentially scan the subsegments, starting from a subsegment that is closest to the first object, to identify the second object that is closest to the first object, wherein the second object is within one of the subsegments, wherein sequentially scan the subsegments includes:

when there is a plurality of objects in the subsegment, identify the second object that is closest to a center line dividing the first quadrant; and when there are multiple objects from the plurality of objects within same distance from the center line in the subsegment, identify the second object that is left most of the multiple objects from the plurality of objects within same distance from the center line; and select the second object, wherein the second object is within the segment of the first quadrant.

17. The system of claim 16, wherein the segments of the quadrant are concentric and the program code to scan the segments of the first quadrant comprises program code to:

scan the segments sequentially starting from a center segment.

18. The system of claim 16, wherein the segments of the quadrant are concentric and the program code to divide the area around the first object into the quadrant comprises program code to:

divide the area around the first object into four quadrants.

19. The system of claim 18, wherein the segments are divided such that the width of the segments is equal to the shortest of the distances between the plurality of the objects.

20. The system of claim 16, wherein the segments of the first quadrant are parallel and the program code to scan the segments of the first quadrant comprises program code to:

scan the segment sequentially starting from a center segment, wherein the first object and second object comprise text.

21. The system of claim 16, wherein the segments are divided such that the width of the segments is equal to line height of the text.

22. The system of claim 16, wherein the first direction includes an up direction, a down direction, a left direction, or a right direction.

* * * * *